United States Patent
Dejneka et al.

(10) Patent No.: US 10,829,408 B2
(45) Date of Patent: Nov. 10, 2020

(54) GLASS-CERAMICS AND METHODS OF MAKING THE SAME

(71) Applicant: Corning Incorporated, Corning, NY (US)

(72) Inventors: Matthew John Dejneka, Corning, NY (US); Jesse Kohl, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/190,297

(22) Filed: Nov. 14, 2018

(65) Prior Publication Data

US 2019/0177209 A1 Jun. 13, 2019

Related U.S. Application Data

(60) Provisional application No. 62/598,108, filed on Dec. 13, 2017.

(51) Int. Cl.
| | | |
|---|---|---|
| *C03C 10/00* | (2006.01) | |
| *C03C 4/08* | (2006.01) | |
| *C03B 32/02* | (2006.01) | |
| *G02B 5/20* | (2006.01) | |
| (Continued) | | |

(52) U.S. Cl.
CPC .......... *C03C 10/0027* (2013.01); *C03B 32/02* (2013.01); *C03C 3/091* (2013.01); *C03C 3/097* (2013.01); *C03C 4/085* (2013.01); *C03C 10/0018* (2013.01); *C03C 10/0054* (2013.01); *G02B 5/208* (2013.01); *C03C 2204/00* (2013.01)

(58) Field of Classification Search
CPC ............ C03C 10/0027; C03C 10/0018; C03C 10/0054; C03C 32/02; C03C 4/085
USPC .......................................................... 428/212
See application file for complete search history.

(56) References Cited

U.S. PATENT DOCUMENTS

| | | | |
|---|---|---|---|
| 2,860,059 A | | 11/1958 | Molter et al. |
| 3,293,052 A | * | 12/1966 | Sawchuk ................ C03C 4/065 501/13 |
| 3,607,320 A | | 9/1971 | Sakka |
| (Continued) | | | |

FOREIGN PATENT DOCUMENTS

WO 2017218859 A1 12/2017

OTHER PUBLICATIONS

Durville et al; "Laser Induced Refractive Index Gratings in Eu3+ Glasses", Journal De Physique Collaques, 48[C7], 513-515 (1987).
(Continued)

*Primary Examiner* — Tahseen Khan
(74) *Attorney, Agent, or Firm* — Smit Kapadia

(57) ABSTRACT

A glass-ceramic includes $SiO_2$ from about 50 mol % to about 80 mol %, $Al_2O_3$ from about 0.3 mol % to about 15 mol %, $B_2O_3$ from about 5 mol % to about 40 mol %, $WO_3$ from about 2 mol % to about 15 mol %, and $R_2O$ from about 0 mol % to about 15 mol %, wherein $R_2O$ is one or more of $Li_2O$, $Na_2O$, $K_2O$, $Rb_2O$ and $Cs_2O$. A difference in the amount of the $R_2O$ and the $Al_2O_3$ ranges from about −12 mol % to about 2.5 mol %.

14 Claims, 18 Drawing Sheets

(51) Int. Cl.
*C03C 3/091* (2006.01)
*C03C 3/097* (2006.01)

(56) References Cited

U.S. PATENT DOCUMENTS

| | | | |
|---|---|---|---|
| 3,985,534 | A | 10/1976 | Flannery et al. |
| 4,859,637 | A | 8/1989 | Roberts |
| 5,077,133 | A | 12/1991 | Cheng |
| 5,240,886 | A | 8/1993 | Gulotta et al. |
| 5,320,986 | A | 6/1994 | Taniguchi et al. |
| 5,350,972 | A | 9/1994 | Bucher et al. |
| 5,364,820 | A | 11/1994 | Morimoto et al. |
| 5,537,505 | A * | 7/1996 | Borrelli ............... C03C 3/108 385/142 |
| 5,776,846 | A | 7/1998 | Sakaguchi et al. |
| 5,817,160 | A | 10/1998 | Nagpal et al. |
| 5,932,501 | A | 8/1999 | Brocheton |
| 6,037,286 | A | 3/2000 | Weiser et al. |
| 6,124,038 | A | 9/2000 | Araujo |
| 6,323,585 | B1 | 11/2001 | Crane et al. |
| 7,309,670 | B2 | 12/2007 | Fujiwara et al. |
| 7,375,043 | B2 | 5/2008 | Fechner et al. |
| 7,517,822 | B2 | 4/2009 | Fechner et al. |
| 7,700,506 | B2 | 4/2010 | Fechner et al. |
| 7,795,164 | B2 | 9/2010 | Ritzberger et al. |
| 8,283,269 | B2 | 10/2012 | Fechner et al. |
| 8,635,887 | B2 | 1/2014 | Black et al. |
| 2006/0009343 | A1* | 1/2006 | Fechner ............... C03C 3/089 501/65 |
| 2010/0073765 | A1* | 3/2010 | Brocheton ........... C03C 3/068 359/361 |
| 2012/0113640 | A1* | 5/2012 | Markle ............... F21V 14/02 362/249.02 |
| 2012/0135199 | A1* | 5/2012 | Satou ................ C03B 11/08 428/172 |
| 2015/0260372 | A1* | 9/2015 | Quadri ............... F21V 29/15 362/263 |
| 2015/0364626 | A1* | 12/2015 | Lim .................. H01L 51/442 136/256 |
| 2017/0362119 | A1 | 12/2017 | Dejneka et al. |

OTHER PUBLICATIONS

Glebov; "Photosensitive Glass for Phase Hologram Recording"; Glass Science and Technology, 71C, 85-90 (1998).

Glebov; "Volume Hologram Recording in Inorganic Glasses"; Glass Sci. Technol. 75 C1 (2002) p. 73-90.

Itoh et al; "Fabrication of Small Bragg Reflectors in Glass With Refractive Index Change Induced by Ultrashort Laser Pulses"; SPIE, vol. 3801 (1999); pp. 158-168.

Johnston; "Optical Spectra of the Various Valence States of Vanadium in Na2O 2SiO2 Glass"; Journal of the American Ceramic Society; vol. 48, No. 12; (1965) pp. 608-611.

Moore; "Gradient-Index Optics: A Review"; Applied Optics; vol. 19, No. 7 (1980) pp. 1035-1038.

Oh et al; "Silica Optical Fiber Technology for Devices and Components: Design, Fabrication, and International Standards", John Wiley & Sons, ISBN: 047145558X, 9780471455585 (2012). (pp. 42 and 190).

Ramaswamy et al; "Ion-Exchanged Glass Waveguides: A Review"; Journal of Lightwave Technology; vol. 6, No. 6; (1988); pp. 984-1002.

Rao et al; "Optical Properties of Vacuum Evaporated WO3 Thin Films"; Research Journal of Chemical Sciences, vol. 1 (7); (2011) pp. 76-80.

Schultz; "Optical Absorption of the Transition Elements in Vitreous Silica"; Journal of the American Ceramic Society; vol. 57, No. 7; (1974); pp. 309-313.

Thiemsorn et al; "Redox Ratio and Optical Absorption of Polyvalent Ions in Industrial Glasses"; Bull. Mater. Sci., vol. 30, No. 5; (2007); pp. 487-495.

Tomlinson; "Applications of Grin-Rod Lenses in Optical Fiber Communication Systems"; Applied Optics; vol. 19; No. 7; (1980); pp. 1127-1138.

Trusova et al; "Nature of Color Centers in Silicate Glasses With Additions of Cerium and Titanium Oxides"; Glass and Ceramics; vol. 66, Nos. 7-8; (2009) pp. 240-244.

Yang et al; "Photo-Induced Refractive Index Change of Bismuth-Based Silicate Glass"; J. Phys. D: Appl. Phys.; 38 (2005) pp. 1461-1463.

Zhao et al; "Temperature Dependence of Femtosecond Laser Induced Refractive Index Change in Nd3+-Doped Phosphate Glass"; Optical Materials, 27, (2005) pp. 1159-1162.

International Search Report and Written Opinion PCT/US2018/064990 dated Mar. 20, 2019, 11 Pgs.

\* cited by examiner

GLASS-CERAMICS AND METHODS OF MAKING THE SAME

This application claims the benefit of priority to U.S. Provisional Application Ser. No. 62/598,108 filed on Dec. 13, 2017, the content of which is relied upon and incorporated herein by reference in its entirety.

FIELD OF THE DISCLOSURE

The disclosure generally relates to glass-ceramics and methods of making them, including glass-ceramic materials and articles that include tungsten oxide, aluminoborosilicate compositions.

BACKGROUND

Specialized transparencies useful in the blocking or decreased transmission of low wavelength light (e.g., blue colors and lower) are often desired for a variety of industrial applications including applications utilizing lasers. Such transparencies may be known as "blue blockers." Due to the harsh operating conditions in which the transparency may be utilized, ultraviolet (UV) rejecting coatings may not be suitable because the coatings often lack the necessary mechanical, chemical, and thermal durability. UV absorbing glasses also can be utilized, but the UV absorbent dopants employed in UV absorbing glasses may impart color or otherwise negatively affect the optical properties of the glass. Further, glasses employing dopants cadmium and selenium may be highly toxic. The optical absorbance of virtually all UV absorbing glasses is dictated by composition of the glass and melting conditions inside the furnace (e.g., oxidizing or reducing furnace atmosphere) because the composition and furnace atmosphere dictates the oxidation state or ratio of oxidation states of the dopant(s). Thus, once these glasses are melted and formed, minimal post-processing can modify their optical absorbance.

Similar to UV absorbance, there are several techniques for producing relatively large refractive index deltas within a material (e.g., a glass ion exchanged with silver). These techniques, while producing relatively large refractive index deltas are optically altering glass in other ways, for example increasing haze, scattering, or undesired absorption of visible light wavelength. There are tradeoffs and limitations with each technique, but the key parameters when evaluating these methods are the feature size that can be patterned (i.e., resolution), the change in refractive index (delta n or Δn) that can be induced, and the transmittance. Accordingly, there is a need for the development of UV absorbing materials having a low CTE, low toxicity, a modulatable UV cutoff and/or a modulatable refractive index.

SUMMARY OF THE DISCLOSURE

According to some aspects of the present disclosure, a glass-ceramic includes $SiO_2$ from about 50 mol % to about 80 mol %, $Al_2O_3$ from about 0.3 mol % to about 15 mol %, $B_2O_3$ from about 5 mol % to about 40 mol %, $WO_3$ from about 2 mol % to about 15 mol %, and $R_2O$ from about 0 mol % to about 15 mol %. $R_2O$ is one or more of $Li_2O$, $Na_2O$, $K_2O$, $Rb_2O$ and $Cs_2O$. A difference in the amount of the $R_2O$ and the $Al_2O_3$ ranges from about −12 mol % to about 2.5 mol %.

According to some aspects of the present disclosure, a glass-ceramic includes $SiO_2$ from about 55 mol % to about 75 mol %, $Al_2O_3$ from about 5 mol % to about 12 mol %, $B_2O_3$ from about 10 mol % to about 25 mol %, $WO_3$ from about 4 mol % to about 10 mol %, and $R_2O$ from about 3 mol % to about 12 mol %. $R_2O$ is one or more of $Li_2O$, $Na_2O$, $K_2O$, $Rb_2O$ and $Cs_2O$. The glass-ceramic includes an optical transmittance of at least 60% from about 700 nm to about 2700 nm and a sharp cutoff wavelength from about 320 nm to about 420 nm.

According to further aspects of the present disclosure, a method of forming a glass-ceramic article is provided, comprising the steps of: forming a molten glass comprising $SiO_2$ from about 50 mol % to about 80 mol %, $Al_2O_3$ from about 1 mol % to about 15 mol %, $B_2O_3$ from about 5 mol % to about 40 mol %, and $WO_3$ from about 2 mol % to about 15 mol %, cooling the molten glass to form a glass-ceramic article having an ultraviolet light cutoff at a first cutoff wavelength and a first refractive index at a reference wavelength, and heat-treating a portion of the glass-ceramic article at a predetermined temperature for a predetermined time to form a plurality of crystalline precipitates comprising tungsten within a heat-treated portion of the glass-ceramic article. The heat treated portion of the glass-ceramic article exhibits at least one of an ultraviolet light cutoff at a second cutoff wavelength and a second refractive index at the reference wavelength.

According to further aspects of the present disclosure, a glass-ceramic article includes $SiO_2$ from about 50 mol % to about 80 mol %, $Al_2O_3$ from about 1 mol % to about 15 mol %, $B_2O_3$ from about 5 mol % to about 40 mol %, $WO_3$ from about 2 mol % to about 15 mol %. A first portion having an ultraviolet light cutoff at a first cutoff wavelength and a first refractive index at a reference wavelength, and a heat treated portion comprising a plurality of crystalline precipitates comprising tungsten. Wherein the heat treated portion of the glass-ceramic article exhibits at least one of an ultraviolet light cutoff at a second cutoff wavelength and a second refractive index at the reference wavelength.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1A:
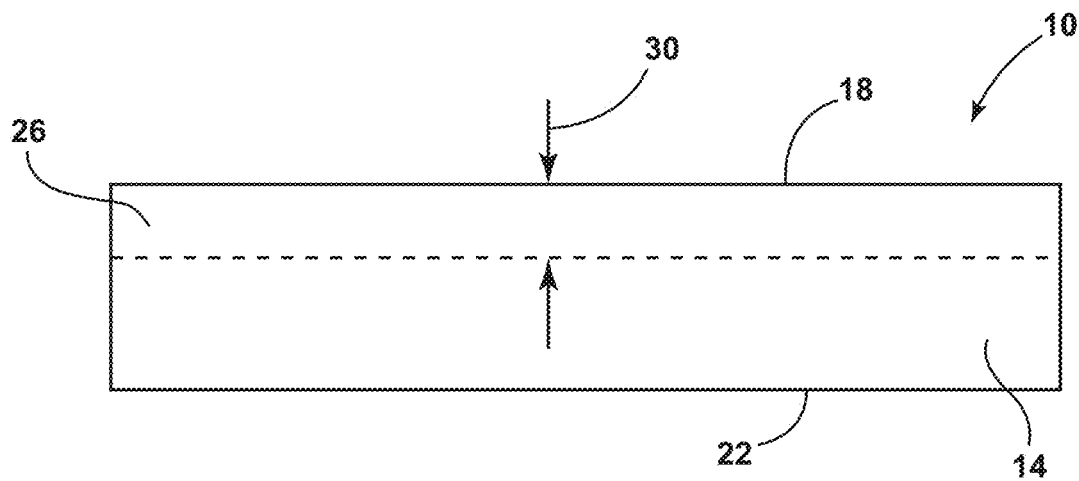
FIG. 1A is a cross-sectional view of an article, according to at least one example of the disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As also used herein, the terms "glass-ceramics," "glass elements," "glass-ceramic article" and "glass-ceramic articles" are used interchangeably, and in their broadest sense, to include any object made wholly or partly of glass and/or glass-ceramic material. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C. unless otherwise specified.

As used herein, "transmission" and "transmittance" refer to external transmission or transmittance, which takes absorption, scattering and reflection into consideration. Fresnel reflection is not subtracted out of the transmission and transmittance values reported herein.

As also used herein, the term "[constituent]-free [glass or glass-ceramic]" (e.g., "cadmium and selenium-free glass-ceramic"), is indicative of a glass or a glass-ceramic that is completely free, or substantially free (i.e., <500 ppm), of the listed constituent(s) and is prepared such that the listed constituent(s) are not actively, intentionally or purposefully added or batched into the glass or glass-ceramic.

As it relates to the glass-ceramics, glass-ceramic materials and articles of the disclosure, compressive stress and depth of compression ("DOC") are measured by evaluating surface stress using commercially available instruments, such as the FSM-6000, manufactured by Orihara Co., Lt. (Tokyo, Japan), unless otherwise noted herein. Surface stress measurements rely upon the accurate measurement of the stress optical coefficient ("SOC"), which is related to the birefringence of the glass. SOC in turn is measured according to a modified version of Procedure C, which is described in ASTM standard C770-98 (2013) ("modified Procedure C"), entitled "Standard Test Method for Measurement of Glass Stress-Optical Coefficient," the contents of which is incorporated herein by reference in its entirety. The modified Procedure C includes using a glass or glass-ceramic disc as the specimen having a thickness of 5 to 10 mm and a diameter of 12.7 mm. The disc is isotropic and homogeneous, and is core-drilled with both faces polished and parallel. The modified Procedure C also includes calculating the maximum force, Fmax, to be applied to the disc. The force should be sufficient to produce at least 20 MPa compression stress. Fmax is calculated using the equation:

$$F\text{max} = 7.854 * D * h$$

where Fmax is the maximum force as measured in Newton (N), D is the diameter of the disc as measured in millimeter (mm), and h is the thickness of the light path as measured in millimeter (mm). For each force applied, the stress is computed using the equation:

$$\sigma \text{ (MPa)} = 8F/(\pi * D * h)$$

where F is the force as measured in Newton (N), D is the diameter of the disc as measured in millimeter (mm), and h is the thickness of the light path as measured in millimeter (mm).

As also used herein, the terms "sharp cutoff wavelength" and "cutoff wavelength" are used interchangeably and refer to a cutoff wavelength within a range of about 350 nm to 800 nm in which the glass-ceramic has a substantially higher transmittance above the cutoff wavelength ($\lambda_c$) in comparison to its transmittance below the cutoff wavelength ($\lambda_c$). The cutoff wavelength ($\lambda_c$) is the wavelength at the midpoint between an "absorption limit wavelength" and a "high transmittance limit wavelength" in the given spectra for the glass-ceramic. The "absorption limit wavelength" is specified as the wavelength in which the transmittance is 5%; and in the "high transmittance wavelength" is defined as the wavelength in which the transmittance is 72%. It will be understood that a "sharp UV cutoff" as used herein may be a sharp cutoff wavelength of cutoff wavelength as described above which occurs within the ultraviolet band of the electromagnetic spectrum.

Figure 1B:
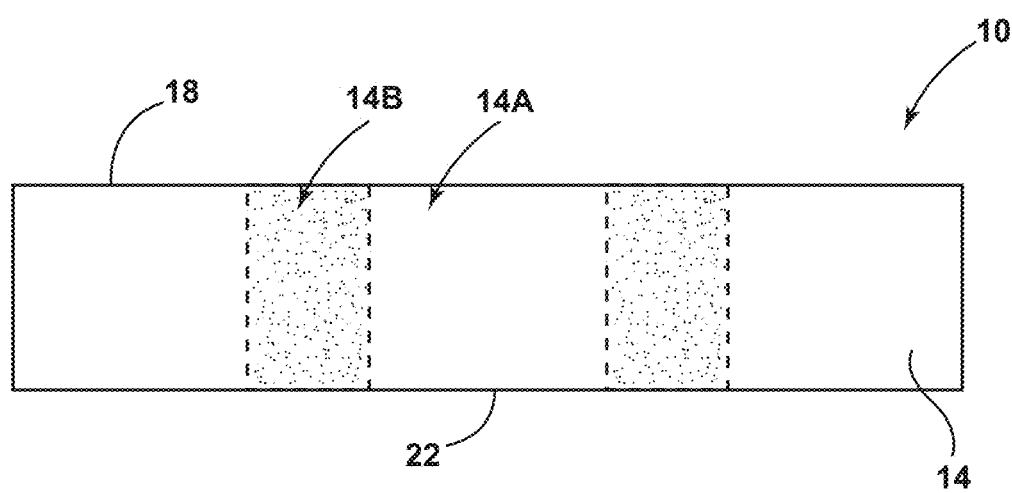
FIG. 1B is a cross-sectional view of an article, according to at least one example of the disclosure.

Referring now to FIGS. 1A and 1B, an article 10 is depicted that includes a substrate 14 having a glass and/or glass-ceramic composition according to the disclosure. The article 10 can be employed in any number of applications. For example, the article 10 and/or substrate 14 can be employed in the form of substrates, elements, covers and other elements in any of the following applications: microlens arrays; Bragg reflectors; gradient refractive index lenses; optical fibers; waveguides; volume gratings (e.g., in augmented reality device engines) and/or ultraviolet laser eye protection lenses.

The substrate 14 defines or includes a pair of opposing primary surfaces 18, 22. In some examples of the article 10, the substrate 14 includes a compressive stress region 26. As shown in FIG. 1A, the compressive stress region 26 extends from the primary surface 18 to a first selected depth 30 in the substrate. Further, in some examples, multiple compressive stress regions 26 may extend from the primary surfaces 18, 22 and/or edges of the substrate 14. The substrate 14 may have a selected length and width, or diameter, to define its surface area. The substrate 14 may have at least one edge between the primary surfaces 18, 22 of the substrate 14 defined by its length and width, or diameter. The substrate 14 may also have a selected thickness. In some examples, the substrate 14 has a thickness of from about 0.2 mm to about 1.5 mm, from about 0.2 mm to about 1.3 mm, and from about 0.2 mm to about 1.0 mm. In other examples, the substrate 14 has a thickness of from about 0.1 mm to about 1.5 mm, from about 0.1 mm to about 1.3 mm, or from about 0.1 mm to about 1.0 mm.

As used herein, a "selected depth," (e.g., first selected depth 30) "depth of compression" and "DOC" are used interchangeably to define the depth at which the stress in the substrate 14, as described herein, changes from compressive to tensile. DOC may be measured by a surface stress meter, such as an FSM-6000, or a scattered light polariscope (SCALP) depending on the ion exchange treatment. Where the stress in a substrate 14 having a glass or a glass-ceramic composition is generated by exchanging potassium ions into the glass substrate, a surface stress meter is used to measure DOC. Where the stress is generated by exchanging sodium ions into the glass substrate, SCALP is used to measure DOC. Where the stress in the substrate 14 having a glass or glass-ceramic composition is generated by exchanging both potassium and sodium ions into the glass substrate, the DOC is measured by SCALP, since it is believed the exchange depth of sodium indicates the DOC and the exchange depth of potassium ions indicates a change in the magnitude of the compressive stress (but not the change in stress from compressive to tensile). The exchange depth of potassium ions in such glass substrates is measured by a surface stress meter. As also used herein, the "maximum compressive stress" is defined as the maximum compressive stress within the compressive stress region 26 in the substrate 14. In some examples, the maximum compressive stress is obtained at or in close proximity to the one or more primary surfaces 18, 22 defining the compressive stress region 26. In other examples, the maximum compressive stress is obtained between the one or more primary surfaces 18, 22 and the selected depth 30 of the compressive stress region 26.

In some examples of the article 10, as depicted in exemplary form in FIG. 1A, the substrate 14 is selected from a chemically strengthened alumino-boro-silicate glass or glass-ceramic. For example, the substrate 14 can be selected from chemically strengthened alumino-boro-silicate glass or glass-ceramic having a compressive stress region 26 extending to a first selected depth 30 of greater than 10 μm, with a maximum compressive stress of greater than 150 MPa. In further examples, the substrate 14 is selected from a chemically strengthened alumino-boro-silicate glass or glass-ceramic having a compressive stress region 26 extending to a first selected depth 30 of greater than 25 μm, with a maximum compressive stress of greater than 400 MPa. The substrate 14 of the article 10 may also include one or more compressive stress regions 26 that extend from one or more of the primary surfaces 18, 22 to a selected depth 30 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some examples, the maximum compressive stress is 2000 MPa or lower. In some embodiments, the maximum compressive stress is about 150 MPa to about 2000 MPa. In some embodiments, the maximum compressive stress is about 200 MPa to about 2000 MPa. In some embodiments, the maximum compressive stress is about 250 MPa to about 2000 MPa. In some embodiments, the maximum compressive stress is about 300 MPa to about 2000 MPa. In some embodiments, the maximum compressive stress is about 350 MPa to about 2000 MPa. In some embodiments, the maximum compressive stress is about 400 MPa to about 2000 MPa. In some embodiments, the maximum compressive stress is about 450 MPa to about 2000 MPa. In some embodiments, the maximum compressive stress is about 500 MPa to about 2000 MPa. In some embodiments, the maximum compressive stress is about 550 MPa to about 2000 MPa. In some embodiments, the maximum compressive stress is about 600 MPa to about 2000 MPa. In some embodiments, the maximum compressive stress is about 650 MPa to about 2000 MPa. In some embodiments, the maximum compressive stress is about 700 MPa to about 2000 MPa. In some embodiments, the maximum compressive stress is about 750 MPa to about 2000 MPa. In some embodiments, the maximum compressive stress is about 800 MPa to about 2000 MPa. In some embodiments, the maximum compressive stress is about 850 MPa to about 2000 MPa. In some embodiments, the maximum compressive stress is about 900 MPa to about 2000 MPa. In some embodiments, the maximum compressive stress is about 1000 MPa to about 2000 MPa. In addition, the depth of compression (DOC) or first selected depth 30 can be set at 10 μm or greater, 15 μm or greater, 20 μm or greater, 25 μm or greater, 30 μm or greater, 35 μm or greater, and to even higher depths, depending on the thickness of the substrate 10 and the processing conditions associated with generating the compressive stress region 26. In some examples, the DOC is less than or equal to 0.3 times the thickness (t) of the substrate 14, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t and all values therebetween.

The substrate 14 of the article 10 can be characterized by a glass-ceramic composition. The glass-ceramic composition may have a coefficient of thermal expansion of from about $10\times10^{-7\circ}$ C.$^{-1}$ to about $60\times10^{-7\circ}$ C. Further, the glass-ceramic exhibits good durability and resistance to moisture. The glass-ceramic compositions of the present disclosure may have one or more of the physical properties disclosed in Table 1.

TABLE 1

| Physical Property | Value |
| --- | --- |
| Softening Point (° C.) | 963.1 |
| Annealing Point (° C.) | 557 |
| Strain Point (° C.) | 495 |
| Coefficient of Thermal Expansion (xE–7/° C. at 20° C.) | 33.5 |
| Density (g/cm$^3$ at 4° C.) | 2.335 |

In various examples, the glass-ceramic composition of the substrate 14 may include $Al_2O_3$, $SiO_2$, $B_2O_3$, $WO_3$ and an optional alkali metal oxide. The glass-ceramic composition may include from about 0.3 mol % to about 15 mol % $Al_2O_3$, or from about 5 mol % to about 12 mol % $Al_2O_3$, or from about 5 mol % to about 10 mol % $Al_2O_3$. For example, the glass-ceramic composition may have about 0.3 mol %, 0.5 mol %, 0.8 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol % or about 15 mol % of $Al_2O_3$. The glass-ceramic composition may contain from about 5 mol % to about 40 mol % of $B_2O_3$, or about 10 mol % to about 25 mol % $B_2O_3$. It will be understood that any and all values between about 5 mol % to about 40 mol % of $B_2O_3$ are contemplated. The glass-ceramic composition may have from about 50 mol % to about 80 mol % $SiO_2$, or from about 55 mol % to about 75 mol % $SiO_2$, or from about 60 mol % to about 70 mol % $SiO_2$. It will be understood that any and all values between about 50 mol % to about 80 mol % of $SiO_2$ are contemplated. Further, the glass-ceramic may include from about 0 mol % to about 0.5 mol % of $SnO_2$, or from about 0 mol % to about 0.2 mol % of $SnO_2$, or from about 0 mol % to about 0.1 mol % of $SnO_2$.

The glass-ceramic composition may include at least one alkali metal oxide. The alkali metal oxide may be represented by the chemical formula $R_2O$ where R is one or more of $Li_2O$, $Na_2O$, $K_2O$, $Rb_2O$, $Cs_2O$ and/or combinations thereof. The glass-ceramic composition may have an alkali metal oxide composition of from about 0 mol % to about 15 mol %, or from about 3 mol % to about 12 mol %, or from about 7 mol % to about 10 mol %. For example, the glass-ceramic composition may have about 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol % or about 15 mol % of an alkali metal oxide. According to various examples a difference in the amount of the at least one alkali metal oxide and the $Al_2O_3$ ranges from about −12 mol % to about 2.5 mol %, or from about −6% to about 0.25%, or from about −3.0 mol % to about 0 mol %. This allows all alkali to be bound by the glass, preventing it from forming alkali tungsten bronzes (non-stoichiometric tungsten sub-oxides) or stoichiometric alkali tungstates (e.g., $Na_2WO_4$). It will be understood that the glass-ceramic composition may have no alkali material oxide content.

The glass-ceramic may be substantially cadmium free and substantially selenium free. According to various examples, the glass-ceramic can further include at least one dopant selected from the group consisting of Ti, V, Cr, Mn, Fe, Ni, Cu, Pb, Pd, Au, Cd, Se, Ta, Bi, Ag, Ce, Pr, Nd, and Er to alter the ultraviolet, visual, and/or near-infrared absorbance. The dopants may have concentration of from about 0.0001 mol % to about 1.0 mol % within the glass-ceramic. The glass-ceramic may include fluorine in the range of about 0 mol % to about 5 mol % to soften the glass-ceramic. The glass-ceramic may include phosphorus in the range of about 0 mol % to about 5 mol % to further modify physical properties of the glass-ceramic and modulate crystal growth. The glass-ceramic may include ZnO from about 0 mol % to about 5 mol % to further modify physical properties of the glass-ceramic and modulate crystal growth. In some embodiments, the glass-ceramic may include $Ga_2O_3$, $In_2O_3$ and/or $GeO_2$ to further modify physical and optical (e.g., refractive index) properties of the glass-ceramic. In some embodiments, the $Ga_2O_3$, $In_2O_3$ and/or $GeO_2$ may be substituted for up to 75% of $Al_2O_3$ and $SiO_2$, respectively. The following trace impurities may be present in the range of about 0.001 mol % to about 0.5 mol % to further modify the UV, visible (e.g., 390 nm to about 700 nm), and near-infrared (e.g., about 700 nm to about 2500 nm) absorbance and/or make the glass-ceramic fluoresce: Ti, V, Cr, Mn, Fe, Co, Ni, Cu, Se, Nb, Mo, Tc, Ru, Rh, Pd, Ag, Cd, Te, Ta, Re, Os, Ir, Pt, Au, Ti, Pb, Bi, Ce, Pr, Nd, Sm, Eu, Gd, Tb, Dy, Ho, Er, Tm, Yb, and Lu.

The glass-ceramic composition may include from about 2 mol % to about 15 mol %, $WO_3$, or from about 4 mol % to about 10 mol % of $WO_3$, or from about 5 mol % to about 7 mol % $WO_3$. For example, the glass-ceramic composition may have about 2 mol %, 3 mol %, 4 mol %, 5 mol %, 6 mol %, 7 mol %, 8 mol %, 9 mol %, 10 mol %, 11 mol %, 12 mol %, 13 mol %, 14 mol % or about 15 mol % of $WO_3$ and all values therebetween.

In various examples, the glass-ceramic composition of the substrate 14 may include $TiO_2$. The article may include $TiO_2$ in a concentration of about 0.25 mol %, or about 0.50 mol %, or about 0.75 mol %, or about 1.0 mol %, or about 2.0 mol %, or about 3.0 mol %, or about 4.0 mol %, or about 5.0 mol %, or about 6.0 mol %, or about 7.0 mol %, or about 8.0 mol %, or about 9.0 mol %, or about 10.0 mol %, or about 11.0 mol %, or about 12.0 mol %, or about 13.0 mol %, or about 14.0 mol %, or about 15.0 mol %, or about 16.0 mol %, or about 17.0 mol %, or about 18.0 mol %, or about 19.0 mol %, or about 20.0 mol %, or about 21.0 mol %, or about 22.0 mol %, or about 23.0 mol %, or about 24.0 mol %, or about 25.0 mol %, or about 26.0 mol %, or about 27.0 mol %, or about 28.0 mol %, or about 29.0 mol %, or about 30.0 mol % or any and all values and ranges therebetween. For example, the article may include $TiO_2$ in a concentration of from about 0.25 mol % to about 30 mol %, or from about 1 mol % to about 30 mol % $TiO_2$, or from about 1.0 mol % to about 15 mol % $TiO_2$, or from about 2.0 mol % to about 15 mol % $TiO_2$, or from about 2.0 mol % to about 15.0 mol % $TiO_2$. It will be understood that any and all values and ranges between the above noted ranges of $TiO_2$ are contemplated.

According to various examples, the article may include one or more metal sulfides. For example, the metal sulfides may include MgS, $Na_2S$, and/or ZnS. According to various examples, the article may include one or more metal sulfides. For example, the metal sulfides may include MgS, $Na_2S$, and/or ZnS. The article may include metal sulfides in a concentration of about 0.25 mol %, or about 0.50 mol %, or about 0.75 mol %, or about 1.0 mol %, or about 2.0 mol %, or about 3.0 mol %, or about 4.0 mol %, or about 5.0 mol %, or about 6.0 mol %, or about 7.0 mol %, or about 8.0 mol %, or about 9.0 mol %, or about 10.0 mol %, or about 11.0 mol %, or about 12.0 mol %, or about 13.0 mol %, or about 14.0 mol %, or about 15.0 mol %, or about 16.0 mol %, or about 17.0 mol %, or about 18.0 mol %, or about 19.0 mol %, or about 20.0 mol %, or about 21.0 mol %, or about 22.0 mol %, or about 23.0 mol %, or about 24.0 mol %, or about 25.0 mol %, or about 26.0 mol %, or about 27.0 mol %, or about 28.0 mol %, or about 29.0 mol %, or about 30.0 mol % or any and all values and ranges therebetween. For example, the article may include metal sulfides in a concentration of from about 0.25 mol % to about 30 mol %, or from about 1.0 mol % to about 15 mol %, or from about 1.5 mol % to about 5 mol %.

Similarly to the tungsten and molybdenum oxides highlighted above, the examples of the article including titanium may also produce a crystalline phase composed of precipitates of titanium oxide. The crystalline phase includes an oxide, from about 0.1 mol % to about 100 mol % of the crystalline phase, of Ti and an alkali metal cation. Without being bound by theory, it is believed that during thermal processing (e.g., heat treating) of the article, titanium cations agglomerate to form crystalline precipitates near and or on the metal sulfides thereby transforming the glass state into the glass-ceramic state. The metal sulfide may serve a dual role in both functioning as a nucleating agent (i.e., as the metal sulfide may have a higher melting temperature than the melt thereby serving as a seed crystal onto which the titanium may agglomerate) and as a reducing agent (i.e., metal sulfides are high reducing agents and as such the agglomerated titanium may be reduced to a 3+ state). As such, the titanium present in the precipitates may be reduced, or partially reduced due to the metal sulfides. For example, the titanium within the precipitates may have an oxidation state of between 0 and about +4. For example, the precipitates may have the general chemical structure of $TiO_2$. However, there can also be a significant fraction of titanium in the +3 oxidation state, and in some cases these Ti' cations may be charge stabilized by species intercalated into channels in the titania crystal lattice, forming compounds known as non-stoichiometric titanium suboxides, "titanium bronzes," or "bronze-type" titanium crystals. One or more of the above-noted alkali metals and/or dopants may be present within the precipitates to compensate the +3 charge on the Ti. Titanium bronzes are a group of non-stoichiometric titanium suboxides that takes the general chemical form of $M_xTiO_2$ where M=one or more dopant cation of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, V, Cr, Mn, Fe, Ni, Cu, Pd, Se, Ta, Bi, and Ce, and where $0<x<1$. The structure $M_xTiO_2$ is considered to be a solid state defect structure in which holes (i.e. vacancies or channels in crystal lattice) in a reduced $TiO_2$ network are randomly occupied by M atoms, which are dissociated into M+ cations and free electrons. Depending on the concentration of "M," the material properties can range from metallic to semi-conducting, thereby allowing a variety of optical absorption and electronic properties to be tuned. The more 3+Ti, the more M+ cations may be needed to compensate and the greater the value of x.

Consistent with the above disclosure, titanium bronzes are non-stoichiometric compounds generally of formula $M_xTiO_2$, where M is a cation dopant, such as some other metal, most commonly an alkali, and x is a variable less than 1. For clarity, though called a 'bronze', these compounds are not structurally or chemically related to metallic bronze, which is an alloy of copper and tin. Titanium bronzes are a spectrum of solid phases where homogeneity varies as a function of x. Depending on dopant M and corresponding concentration x, material properties of a titanium bronze may range from metallic to semi-conducting, and exhibit tunable optical absorption. The structure of these bronzes is a solid-state defect structure in which M' dopant cations intercalate (i.e., occupy) into holes or channels of binary oxide hosts and disassociate into M+ cations and free electrons.

For clarity, $M_xTiO_2$ is a naming convention for a complex system of non-stoichiometric or 'sub-stoichiometric' compounds, with varying crystal structures that can be monoclinic, hexagonal, tetragonal, cubic, or pyrochlore, where M can one or a combination of certain elements on the periodic table, where x varies from $0<x<1$, where the oxidation state of the bronze forming specie (in this case Ti) is a mixture of the specie in its highest oxidation state ($Ti^{4+}$) and a lower oxidation state (e.g., $Ti^{3+}$), and where the number two ("2") in $TiO_2$ represents the number of oxygen anions that may be between 1 and 2. Accordingly, $M_xTiO_2$ may alternatively be expressed as the chemical form $M_xTiO_z$, where $0<x<1$, and $1<z<2$, or as $M_xTiO_{2-z}$ where $0<x<1$ and $0<z<1$. However, for brevity, $M_xTiO_2$ is utilized for this family of non-stoichiometric crystals. Similarly, 'bronze' in general applies to a ternary metal oxide of formula $M'_xM''_yOz$ where (i) M" is a transition metal, (ii) $M''_yOz$ is its highest binary oxide, (iii) M' is some other metal, (iv) x is a variable falling in the range $0<x<1$.

According to various examples, the glass-ceramic article including titanium may be substantially free of W, Mo, and rare earth elements. As highlighted above, the ability for titanium to form its own suboxides may eliminate the need for tungsten and molybdenum and the titanium suboxides may not need rare earth elements.

According to various examples, the glass-ceramic article may have a low concentration or be free of iron. For example, the article may include about 1 mol % or less of Fe, or about 0.5 mol % or less of Fe, or about 0.1 mol % or less of Fe, or 0.0 mol % Fe or any and all values and ranges therebetween.

According to various examples, the glass-ceramic article may have a low concentration or be free of lithium. For example, the article may include about 1 mol % or less of Li, or about 0.5 mol % or less of Li, or about 0.1 mol % or less of Li, or 0.0 mol % Li or any and all values and ranges therebetween.

According to various examples, the glass-ceramic article may have a low concentration or be free of zirconium. For example, the article may include about 1 mol % or less of Zr, or about 0.5 mol % or less of Zr, or about 0.1 mol % or less of Zr, or 0.0 mol % Zr or any and all values and ranges therebetween.

Similar to the formation of the tungsten or molybdenum containing articles, articles including titanium may be formed by a method including steps of: melting together constituents including silica and titanium to form a glass melt; solidifying the glass melt to form a glass; and precipitating, within the glass, bronze-type crystals including the titanium to form the glass-ceramic. According to various examples, the precipitating of the bronze-type crystals may be performed via one or more thermal treatments. The thermal treatment, for titanium bronze-type crystals, may be performed at a temperature of from about 400° C. to about 900° C., or from about 450° C. to about 850° C., or from about 500° C. to about 800° C., or from about 500° C. to about 750° C., or from about 500° C. to about 700° C. or any and all values and ranges therebetween. In other words, precipitating the bronze-type crystals is performed at a temperature of from about 450° C. to about 850° C. or precipitating the bronze-type crystals is performed at a temperature of from about 500° C. to about 700° C. The thermal treatment may be carried out for a time period of from about 15 minutes to about 240 minutes, or from about 15 minutes to about 180 minutes, or from about 15 minutes to about 120 minutes, or from about 15 minutes or about 90 minutes, or from about 30 minutes to about 90 minutes, or from about 60 minutes to about 90 minutes or any and all values and ranges therebetween. In other words, precipitating the bronze-type crystals is performed for a time period of from about 15 minutes to about 240 minutes or precipitating the bronze-type crystals is performed for a time period of from about 60 minutes to about 90 minutes. The thermal treatment may be carried out in ambient air, in an inert atmosphere or in a vacuum.

Formation of the titanium suboxides in titanium containing examples of the article may result in a difference in absorption and transmittance of different wavelength bands of light. In a ultraviolet (UV) band of light (e.g., from about 200 nm to about 400 nm) the article in the glass-state, prior to precipitation of the titanium suboxides, may have an average UV transmittance of about 18% to about 30%. For example, the average UV transmittance of the article in the glass-state may be about 18%, or about 19%, or about 20%, or about 21%, or about 22%, or about 23%, or about 24%, or about 25%, or about 26%, or about 27%, or about 28%, or about 29%, or about 30% or any and all values and ranges therebetween. After the formation or precipitation of the titanium suboxides, the article in the glass-ceramic state may have an average UV transmittance of about 0.4% to about 18%. For example, the average UV transmittance of the article in the glass-ceramic state may be about 0.4%, or about 0.5%, or about 1%, or about 2%, or about 3%, or about 4%, or about 5%, or about 6%, or about 7%, or about 8%, or about 9%, or about 10%, or about 11% or about 12% or about 13% or about 14% or about 15% or about 16% or about 17% or about 18% or any and all values and ranges therebetween. It will be understood that the above-noted transmittance values may exist in articles having a thickness, or path length of the light, of from about 0.4 mm to about 1.25 mm.

In a visible band of light (e.g., from about 400 nm to about 750 nm) the article in the glass-state, prior to precipitation of the titanium suboxides, may have an average visible transmittance of about 60% to about 85%. For example, the average visible transmittance of the article in the glass-state may be about 60%, or about 61%, or about 62%, or about 63%, or about 64%, or about 65%, or about 66%, or about 67%, or about 68%, or about 69%, or about 70%, or about 71%, or about 72%, or about 73%, or about 74%, or about 75%, or about 76%, or about 77%, or about 78%, or about 79%, or about 80%, or about 81%, or about 82%, or about 83%, or about 84%, or about 85% or any and all values and ranges therebetween. After the formation or precipitation of the titanium suboxides, the article in the glass-ceramic state may have an average visible transmittance of about 4% to about 85%. For example, the average UV transmittance of the article in the glass-ceramic state may be about 4%, or about 5%, or about 10%, or about 20%, or about 30%, or about 40%, or about 50%, or about 60%, or about 70%, or about 80%, or about 85% or any and all values and ranges therebetween. It will be understood that the above-noted transmittance values may exist in articles having a thickness, or path length of the light, of from about 0.4 mm to about 1.25 mm.

In a near-infrared (NIR) band of light (e.g., from about 750 nm to about 1500 nm) the article in the glass-state, prior to precipitation of the titanium suboxides, may have an average NIR transmittance of about 80% to about 90%. For example, the average NIR transmittance of the article in the glass-state may be about 80%, or about 81%, or about 82%, or about 83%, or about 84%, or about 85%, or about 86%, or about 87%, or about 88%, or about 89%, or about 90% or any and all values and ranges therebetween. After the formation or precipitation of the titanium suboxides, the article in the glass-ceramic state may have an average NIR transmittance of about 0.1% to about 10%. For example, the average UV transmittance of the article in the glass-ceramic state may be about 1%, or about 2%, or about 3%, or about 4%, or about 5%, or about 6%, or about 7%, or about 8%, or about 9%, or about 10% or any and all values and ranges therebetween. It will be understood that the above-noted transmittance values may exist in articles having a thickness, or path length of the light, of from about 0.4 mm to about 1.25 mm.

In the NIR band of light, the article in the glass-state, without the titanium suboxides, may have an average optical density per mm (i.e., a first near-infrared absorbance) of about 0.4 or less, or about 0.35 or less, or about 0.3 or less, or about 0.25 or less, or about 0.2 or less, or about 0.15 or less, or about 0.1 or less, or about 0.05 or less or any and all values and ranges therebetween. After the precipitation of the titanium suboxides, the article in the glass-ceramic state, with the titanium suboxides, may have an optical density per mm (i.e., a second near-infrared absorbance) of about 6.0 or less, or about 5.5 or less, or about 5.0 or less, or about 4.5 or less, or about 4.0 or less, or about 3.5 or less, or about 3.0 or less, or about 2.5 or less, or about 2.0 or less, or about 2.0 or less, or about 1.5 or less, or about 1.0 or less, or about 0.5 or less or any and all values and ranges therebetween. As such, in some cases a ratio of the second average near-infrared absorbance to the first average near-infrared absorbance may be about 1.5 or greater, or about 2.0 or greater, or about 2.5 or greater, or about 3.0 or greater, or about 5.0 or greater, or about 10.0 or greater. In such examples, the average optical density per mm at visible wavelengths of the article in the glass-ceramic state with the titanium suboxides may be 1.69 or less.

According to various examples, the article may exhibit a low haze. For example, the article may exhibit a haze of about 20% or less, or about 15% or less, or about 12% or less, or about 11% or less, or about 10.5% or less, or about 10% or less, or about 9.5% or less, or about 9% or less, or about 8.5% or less, or about 8% or less, or about 7.5% or less, or about 7% or less, or about 6.5% or less, or about 6% or less, or about 5.5% or less, or about 5% or less, or about 4.5% or less, or about 4% or less, or about 3.5% or less, or about 3% or less, or about 2.5% or less, or about 2% or less, or about 1.5% or less, or about 1% or less, or about 0.5% or less, or about 0.4% or less, or about 0.3% or less, or about 0.2% or less, or about 0.1% or less or any and all values and ranges therebetween. The haze of the article is measured on a 1 mm thick sample and in accordance with the procedure outlined above in connection with haze measurement. According to various examples, the haze of the article may be lower than conventional glass-ceramics due to the absence of beta-quartz (i.e. Virgilite) which is often present in certain glass-ceramics, but which tends to increase haze. In other words, the glass-ceramic article may be free of a beta-quartz crystalline phase. Further, the haze of the article may be due to the low quantity or absence of large crystallites (e.g., about <100 nm, or about <60 nm, or about <40 nm) which tend to scatter light.

Use of articles which include titanium suboxides, crystals having the general formula $M_XTiO_2$ or nonstoichiometric titanium bronzes may provide a number of advantages.

First, thermal processing times to produce titanium suboxides may be shorter than production of other glass-ceramics. Further, thermal processing temperatures may be below the softening points of the article. Such features may be advantageous in decreasing manufacturing complexity and cost.

Second, color packages (e.g., $TiO_2$+ZnS) can be introduced to a wide range of melt compositions, including those with ion exchange capabilities. Additionally, because a relatively low concentration of the color package is needed, the addition of such color packages may have less effect on chemical durability and other relevant properties of the article.

Third, use of titanium suboxide containing glass-ceramics may provide a fusion formable and chemically strengthenable material for ultraviolet and/or infrared blocking materials that may not have melting difficulties due to radiation trapping. For example, articles including the titanium suboxides, when molted or in the as-cast state (i.e., green state before thermal treatment), are highly transparent at visible and NIR wavelengths, unlike $Fe^{2+}$-doped glasses, which strongly absorb in the near infrared even when molten.

Non-limiting approximate composition ranges of glass-ceramics according to the principles of the disclosure (i.e., composition 1, 2 and 3) ranges are listed below in Table 2 (reported in mol %). It will be understood that the chemical formula $R_2O$ represents an alkali metal oxide (e.g., $Li_2O$, $Na_2O$, $K_2O$, $Cs_2O$ and/or combinations thereof) as explained above.

TABLE 2

|  | $SiO_2$ | $Al_2O_3$ | $B_2O_3$ | $R_2O$ | $WO_3$ | $SnO_2$ | $R_2O—Al_2O_3$ |
|---|---|---|---|---|---|---|---|
| Composition Range 1 | 50 to 80 | 0.3 to 15 | 5 to 40 | 0 to 15 | 2 to 15 | 0 to 0.5 | −12 to 0.5 |
| Composition Range 2 | 55 to 75 | 5 to 12 | 10 to 25 | 3 to 12 | 4 to 10 | 0 to 0.2 | −6 to 0.25 |
| Composition Range 3 | 60 to 70 | 5 to 10 | 15 to 25 | 7 to 10 | 5 to 7 | 0 to 0.1 | −3 to 0 |

According to a specific example within Comp. Range 3, the glass-ceramic composition may include $SiO_2$ at about 60.1 mol %, $Al_2O_3$ at about 6.6 mol %, $Cs_2O$ at about 6.6 mol %, $WO_3$ at about 6.6 mol %, $SnO_2$ at about 0.1 mol % and $B_2O_3$ at about 20 mol %. In yet another specific example, the glass-ceramic composition may include $SiO_2$ at about 66 mol %, $Al_2O_3$ at about 9 mol %, $Li_2O$ at about 3 mol %, $WO_3$ at about 2 mol %, $SnO_2$ at about 0 mol % and $B_2O_3$ at about 20 mol %.

Non-limiting exemplary sample compositions of glass-ceramics according to the principles of the disclosure are listed below in Table 2.1. The constituents of the compositions are provided in mol %.

TABLE 2.1

| Sample | $SiO_2$ | $Al_2O_3$ | $Cs_2O$ | $WO_3$ | $SnO_2$ | $B_2O_3$ | $Li_2O$ | $Sb_2O_3$ |
|---|---|---|---|---|---|---|---|---|
| Sample 1 | 77.94 | 0.3 | 0.66 | 1 | 0.1 | 20 | 0 | 0 |
| Sample 2 | 77.58 | 0.66 | 0.66 | 1 | 0.1 | 20 | 0 | 0 |
| Sample 3 | 76.92 | 1.32 | 0.66 | 1 | 0.1 | 20 | 0 | 0 |
| Sample 4 | 76.26 | 1.32 | 1.32 | 1 | 0.1 | 20 | 0 | 0 |
| Sample 5 | 72.3 | 3.3 | 3.3 | 1 | 0.1 | 20 | 0 | 0 |
| Sample 6 | 65.7 | 6.6 | 6.6 | 1 | 0.1 | 20 | 0 | 0 |
| Sample 7 | 64.7 | 6.6 | 6.6 | 2 | 0.1 | 20 | 0 | 0 |
| Sample 8 | 63.7 | 6.6 | 6.6 | 3 | 0.1 | 20 | 0 | 0 |
| Sample 8 | 65.7 | 5.6 | 7.6 | 1 | 0.1 | 20 | 0 | 0 |
| Sample 9 | 65.7 | 4.6 | 8.6 | 1 | 0.1 | 20 | 0 | 0 |
| Sample 10 | 63.7 | 4.6 | 8.6 | 3 | 0.1 | 20 | 0 | 0 |
| Sample 11 | 64.2 | 8.1 | 6.6 | 1 | 0.1 | 20 | 0 | 0 |
| Sample 12 | 62.7 | 9.6 | 6.6 | 1 | 0.1 | 20 | 0 | 0 |
| Sample 13 | 62.2 | 8.1 | 6.6 | 3 | 0.1 | 20 | 0 | 0 |
| Sample 14 | 60.7 | 9.6 | 6.6 | 3 | 0.1 | 20 | 0 | 0 |
| Sample 15 | 60.1 | 6.6 | 6.6 | 6.6 | 0.1 | 20 | 0 | 0 |
| Sample 16 | 63.9 | 7 | 5 | 4 | 0.1 | 20 | 0 | 0 |
| Sample 17 | 63.9 | 9 | 3 | 4 | 0.1 | 20 | 0 | 0 |
| Sample 18 | 62.9 | 10 | 3 | 4 | 0.1 | 20 | 0 | 0 |
| Sample 19 | 61.9 | 11 | 3 | 4 | 0.1 | 20 | 0 | 0 |
| Sample 20 | 62.9 | 9 | 4 | 4 | 0.1 | 20 | 0 | 0 |
| Sample 21 | 66.4 | 9 | 0 | 1.5 | 0.1 | 20 | 3 | 0 |
| Sample 22 | 66.9 | 9 | 0 | 1 | 0.1 | 20 | 3 | 0 |
| Sample 23 | 60.9 | 9 | 0 | 4 | 0.1 | 20 | 6 | 0 |
| Sample 24 | 65.9 | 9 | 0 | 4 | 0.1 | 15 | 6 | 0 |
| Sample 25 | 69.9 | 10 | 0 | 4 | 0.1 | 10 | 6 | 0 |
| Sample 26 | 67.9 | 10 | 0 | 4 | 0.1 | 10 | 8 | 0 |
| Sample 27 | 65.9 | 10 | 0 | 4 | 0.1 | 10 | 10 | 0 |
| Sample 28 | 66 | 9 | 0 | 2 | 0 | 20 | 3 | 0 |
| Sample 29 | 65.9 | 9 | 0 | 2 | 0 | 20 | 3 | 0.1 |

Referring now to FIG. 1B, the substrate 14 incorporating the glass-ceramic as described above may be processed such that a plurality of tungsten-containing structures are precipitated within the substrate 14. Such tungsten containing precipitates may be referred to herein as tungsten oxides, tungsten phases, tungsten-containing precipitates and/or tungsten precipitates. According to at least one example, the substrate 14 may be heat-treated, or otherwise thermally processed, to promote the formation of crystalline tungsten oxide and or tungsten-containing precipitates throughout the substrate 14. Without being bound by theory, it is believed that during processing (e.g., heat treating) of the glass-ceramic composition, tungsten cations agglomerate to form crystalline precipitates thereby forming the glass-ceramic. The crystalline precipitates internally nucleate (i.e., not just at a surface) within the glass-ceramic in a homogenous manner where the substrate 14 is heat-treated. According to various examples, the precipitates may have a generally crystalline structure. As such, the precipitates may be referred to as crystalline precipitates comprising tungsten.

The presence of the precipitates within the glass-ceramic may be determined through a multistep technique. First, a sample of the glass-ceramic composition may be analyzed using x-ray diffraction to detect the presence of the crystalline precipitates. If x-ray diffraction fails to detect the crystalline precipitates (e.g., due to size, quantity and/or chemistry of the precipitates), a second step of analyzing a sample of the glass-ceramic utilizing Ramen spectroscopy may be performed. Ramen spectroscopy represents a reliable manner in determining the presence of a crystalline phase as it may analyze a larger sample size than x-ray diffraction. Optionally, transmission electron microscopy may also be used to visually confirm the presence of crystalline phases within the glass-ceramic.

The crystalline precipitates comprising tungsten may have a diameter, or longest length dimension, of between about 1 nm and about 100 nm, or between about 3 nm and about 30 nm, or between about 6 nm and about 20 nm. The size of the precipitates may be measured using a scanning electron microscope or transmission electron microscope. In one example, the longest length dimension of the precipitates may be determined by visually measuring the longest length dimension. In examples where the longest length dimension of the precipitates is below a visually confirmable size, the dimensions of the precipitates may be determined by inferring the presence of the precipitate phase (e.g., by X-ray diffraction and/or Ramen spectroscopy) and by the failure to resolve any precipitates through electron microscopy (e.g., indicating that the longest dimension of the precipitates is below the resolution level of the scanning electron microscope which is about 10 nm, and preferably about 1 nm). The relatively small diameter or size of the precipitates may be advantageous in reducing the amount of light scattered by the precipitates leading to high optical clarity of the substrate 14 when manufactured using the glass-ceramic outlined above. It will be understood that the tungsten precipitates may have a diameter which is substantially uniform, or may have a variety of sizes. The tungsten present in the precipitates may be reduced, or partially reduced. For example, the tungsten within the precipitates may have an oxidation state of between 0 and about +6. According to various examples, the tungsten may have a +6 oxidation state. According to some embodiments glass ceramic lacks tungsten having an oxidation states less than +6. According to some embodiments glass ceramic has a crystalline phase that lacks tungsten having an oxidation states less than +6. For example, the precipitates may have the general chemical structure of $WO_3$. The precipitates may be known as non-stoichiometric tungsten suboxides and/or "tungsten bronzes." One or more of the above-noted alkali metals and/or dopants may be present within the precipitates. Portions of the substrate 14 where the precipitates are present may lead to changes in the absorbance, reflectance and/or transmission of light, as well as the refractive index as compared to portions of the substrate 14 where different precipitates (e.g., size and/or quantity) and/or no precipitates are present.

Various portions of the article 10 may be heat-treated. For example, a portion, a majority, substantially all and/or an entirety of the article 10 and/or substrate 14 may be heat-treated. The article 10 and/or substrate 14 may define multiple portions. For example, a first portion 14A and a second portion 14B may be present within the substrate 14. It will be understood that the article 10 and/or substrate 14 may include three or more portions without departing from the teachings provided herein. One or both of the first and second portions 14A, 14B may be as-cast, annealed and/or heat-treated. In various examples, the first and second portions are both heat-treated, but for a different time and/or temperature. In yet other examples, one of the first and second portions 14A, 14B is as-cast and the other portion is heat-treated.

According to various examples, the glass-ceramics of the disclosure are optically transparent in the visible region of the spectrum (i.e., from about 400 nm to about 700 nm) both where the precipitates are present and where the precipitates are not present. As used herein, the term "optically transparent" refers to a transmittance of greater than about 1% over a 1 mm path length (e.g., in units of %/mm) over at least one 50 nm-wide wavelength band of light in a range from about 400 nm to about 700 nm. In some examples, the glass-ceramic has a transmittance of at least greater than about 5%/mm, greater than about 10%/mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, and greater than all lower limits between these values, all over at least one 50 nm-wide wavelength band of light in the visible region of the spectrum. It will be understood that the optical transmittance values may be obtained in both heat-treated and non-heat-treated portions (e.g., portions 14A and 14B) of the article 10 and/or substrate 14.

According to various examples, the glass-ceramics of the disclosure absorb light in the ultraviolet ("UV") region (i.e., wavelengths of less than about 370 nm) based on the presence of the precipitates without the use of additional coatings or films. In some implementations, the glass-ceramic is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the UV region of the spectrum (e.g., about 200 nm to about 400 nm). In some examples, the glass-ceramic absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the UV region of the spectrum. The glass-ceramic may have a sharp UV cutoff wavelength from about 320 nm to about 420 nm. For example, the glass-ceramic may have a sharp UV cutoff at about 320 nm, about 330 nm, about 340 nm, about 350 nm, about 360 nm, about 370 nm, about 380 nm, about 390 nm, about 400 nm, about 410 nm, about 420 nm, about 430 nm or any value therebetween. It will be understood that the UV transmittance and UV cutoff values may be obtained in both heat-treated and non-heat-treated portions (e.g., 14A and 14B) of the article 10 and/or substrate 14.

In some examples, the glass-ceramic has a transmittance of at least greater than about 5%/mm, greater than about 10%/mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, greater than about 80%/mm, greater than about 90%/mm and greater than all lower limits between these values, all over at least one 50 nm-wide wavelength band of light in the near infrared region (NIR) of the spectrum (e.g., from about 700 nm to about 2700 nm). As such, the glass-ceramic may exhibit an optical transmittance of about 50% or greater, 55% or greater, 60% or greater, 65% or greater, 70% or greater, 75% or greater, 80% or greater, 85% or greater, 90% or greater from about 700 nm to about 2700 nm and a sharp ultraviolet cutoff wavelength from about 320 nm to about 420 nm. It will be understood that the near-infrared transmittance values may be obtained in both heat-treated and non-heat-treated portions of the article 10 and/or substrate 14.

According to various examples, the glass-ceramic composition may have the following transmittance specifications: <5% transmittance at 351 nm and shorter wavelengths; ≥50% transmittance at 374 nm; and >99% transmittance at 1053 nm.

In some implementations, the glass-ceramic is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the infrared region (IR) of the spectrum (e.g., 700 nm to about 2500 nm). In other examples, the glass-ceramic absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the infrared region of the spectrum.

Without being bound by theory, the glass-ceramic composition is believed to exhibit an ultraviolet ("UV") cutoff and a change in its refractive index as a result of its crystalline precipitates. More specifically, the crystalline tungsten oxide and/or tungsten-containing crystals are believed to result in the refractive index and/or UV cutoff for the substrate 14 where the precipitates are present. The glass-ceramic, without precipitates (e.g., non-heat treated) may have a refractive index of about between about 1.505 and about 1.508 while portions of the article 10 with precipitates may have a refractive index of from about 1.520 to about 1.522. For example, Table 3 illustrates the approximate refractive index of $WO_3$ as compared to wavelength.

TABLE 3

| Wavelength (nm) | Refractive Index |
|---|---|
| 450 | 2.6 |
| 500 | 2.35 |
| 600 | 2.18 |
| 700 | 2.1 |
| 800 | 2.1 |
| 1000 | 2.08 |
| 1100 | 2.07 |

As the tungsten oxide and or tungsten-containing crystalline precipitates have a higher refractive index than the host substrate 14, portions or areas of the substrate 14 in which the precipitates are present may have a higher refractive index than the portions or areas of the substrate 14 where no precipitates are present. In other words, portions of the substrate 14 which have the precipitates may have a refractive index which is a combination of the refractive indices of the glass-ceramic and the precipitates (e.g., higher than the glass-ceramic). Further, as the size and quantity of the precipitates grow (e.g., due to higher heat treatment temperatures and/or longer heat treatments), the total volume of the precipitates within the substrate 14 increases and results in a corresponding increase in the refractive index. Similar to its effect on the refractive index, larger and more numerous precipitates (e.g., due to a higher temperature heat treatment and/or longer heat treatment) lead to an increase in the UV cutoff wavelength of the substrate 14. For example, as the precipitates increase in size and number, the precipitates may absorb longer wavelengths of ultraviolet light leading to an increased UV cutoff wavelength.

Figure 2:
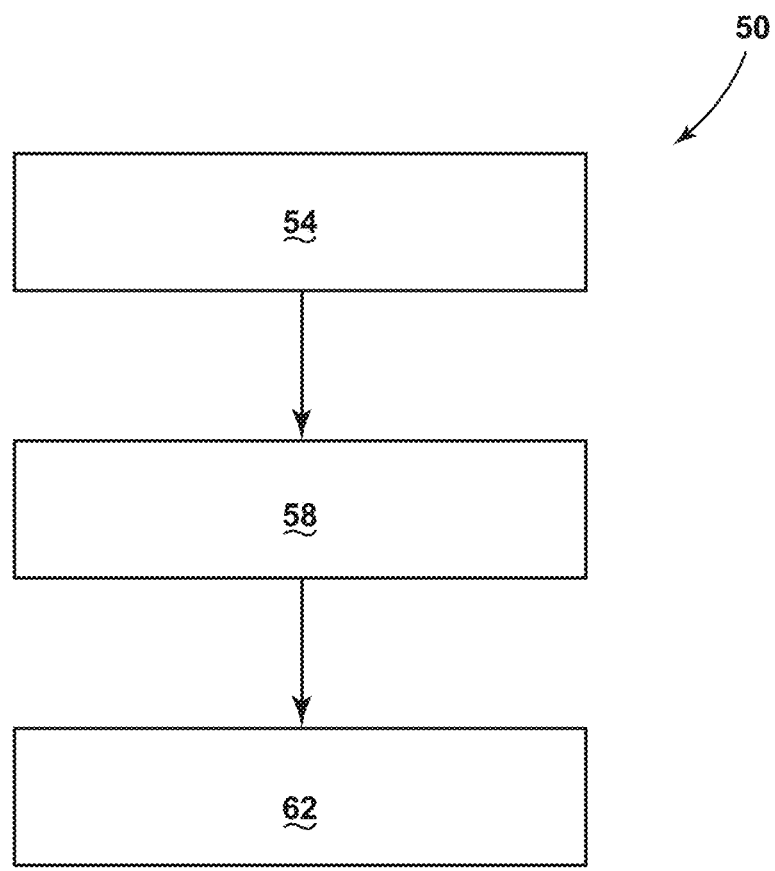
FIG. 2 is a flowchart illustrating a method, according to at least one example.

Referring now to FIG. 2, an exemplary method 50 of producing the article 10 and/or substrate 14 is depicted. The method 50 may begin with a step 54 of forming a molten glass. The molten glass may have the composition of the above-noted glass-ceramic. For example, the glass-ceramic composition may include $SiO_2$ from about 50 mol % to about 80 mol %, $Al_2O_3$ from about 0.3 mol % to about 15 mol %, $B_2O_3$ from about 5 mol % to about 40 mol %, $WO_3$ from about 2 mol % to about 15 mol %. According to various examples, step 54 of forming the molten glass having the glass-ceramic may begin with mixing the constituents of the glass-ceramic composition together. For example, appropriate ratios of the constituents may be mixed and blended by turbulent mixing and/or ball milling. The batched material is then melted at temperatures ranging from about 1500° C. to about 1700° C. for a predetermined time to form the molten glass. In some implementations, the predetermined time ranges from about 6 hours to about 12 hours.

Next, a step 58 of cooling the molten glass to form the article 10 and/or substrate 14 may be performed according to the method 50. Cooling the molten glass may be performed via any process known in the art. According to various examples, steps 54 and 58 may be known as a melt-quench process. The glass-ceramic article 10 formed by the melting and casting of the glass-ceramic composition may have an ultraviolet light cutoff at a first wavelength and a first refractive index at a reference wavelength. As explained above, the formation of the precipitates (e.g., through a heat treating step explained in greater detail below) may result in a change of the UV cutoff wavelength as well as a change in the refractive index of the article 10. For example, the UV cutoff of the as-cast glass-ceramic article 10 may be at a first wavelength of about 355 nm. The refractive index of the glass-ceramic structure may have a first refractive index of from about 1.490 to about 1.534 over a wavelength of from about 400 nm to about 1550 nm with a refractive index of about 1.507 at a reference wavelength of 589 nm. As will be explained in greater detail below, the precipitation of the crystalline precipitates results in a change in the UV cutoff wavelength as well as the refractive index of the heat-treated portion of the article 10 or substrate 14 containing the precipitates.

Next, a step 62 of heat-treating a portion of the glass-ceramic article 10 for at a predetermined temperature for a predetermined time to form a plurality of precipitates within the heat treated portion of the glass-ceramic structure can be performed according to the method 50. As explained above, the crystalline precipitates may have the general chemical formula of $WO_3$. The heat treating of the glass-ceramic structure may be performed via a furnace, a laser, (e.g., infrared, ultraviolet, visible) and/or other methods known in the art of heating the glass-ceramic article 10. For example, the laser may be a femtosecond laser used to create highly localized (e.g., an area of from about 100 nm to about 1 μm) heat. In other words, the heat-treated portions of the article 10 and/or substrate 14 may have a length, width, depth or largest diameter of from about 100 nm to about 1 μm. The laser may be rastered such that the heat treating may be performed in a pattern. Non-limiting examples of the laser raster pattern include: alphanumeric text, symbols, indicia, and pictures. Heat treating of the glass-ceramic article 10 may take place over a portion, a majority, substantially all or the entire glass-ceramic article 10. As such, the precipitates formed from the heat-treating may be positioned in a portion, substantially all or all of the glass-ceramic article 10. Accordingly, as the precipitates alter the ultraviolet cutoff and refractive index of the glass-ceramic article 10, different portions of the glass-ceramic article 10 may exhibit, or be characterized, as having different ultraviolet cutoffs and refractive indices. The heat-treating may be carried out for a time between about 0.1 hours and about 4 hours, or from about 0.5 hours to about 3 hours, or from about 0.5 hours to about 2 hours. For example, the glass-ceramic article 10 may be heat-treated for about 0.5 hours, 1.0 hours, 1.5 hours, 2.0 hours, 2.5 hours, 3.0 hours and all values therebetween. The heat-treating step 62 is conducted at or slightly above the annealing point of the glass-ceramic composition, and below its softening point, to develop one or more crystalline tungstate phases or precipitates. The heat treating may be carried out at a temperature of between about 400° C. and about 800° C., or about 500° C. to about 750° C., or about 550° C. to about 700° C., or about 600° C. to about 650° C. For example, the heat-treating may be carried out at temperatures of about 400° C., 450° C., 500° C., 550° C., 600° C., 650° C., 700° C., 750° C., 800° C., and all values therebetween. The temperature of the heat-treating may be sufficiently low enough that the glass-ceramic composition may have a relatively high viscosity of from about $10^{12}$ Poise to about $10^8$ Poise, or from about $10^{11}$ Poise to about $10^9$ Poise. As will be explained in greater detail below, the high viscosity of the glass-ceramic during the heat-treatment may reduce marring or aberrations from generated by the heating of the glass-ceramic because the heat-treating is performed at a temperature below the softening point of the glass-ceramic.

As explained above, the heat treated portion of the glass-ceramic article 10 exhibits at least one of an ultraviolet light cutoff at a second wavelength and a second refractive index at the reference wavelength based on the presence of the $WO_3$ precipitates. For example, the UV cutoff of the heat treated portion of the article 10 may be at a second wavelength of about 320 nm to about 420 nm. As such, the second UV cutoff wavelength may be longer than the first UV cutoff wavelength. The refractive index of the glass-ceramic structure may have a first refractive index of from about 1.496 to about 1.543 over a wavelength of from about 400 nm to about 1550 nm with a refractive index of about 1.52 at a reference wavelength of 589 nm. The second refractive index at the reference wavelength may be greater than the first refractive index at the reference wavelength. For example, a refractive index delta between the first and second refractive indexes may be about $1.5 \times 10^{-3}$ or greater or $1.5 \times 10^{-2}$ or greater. Further, the refractive index delta between the first and second refractive indexes may be about $1 \times 10^{-2}$ or greater from wavelengths ranging from about 400 nm to about 800 nm, or about $1.2 \times 10^{-2}$ or greater from wavelengths ranging from about 415 nm to about 680 nm.

Use of the present disclosure may offer a variety of advantages. First, as the precipitates have a relatively small size, the precipitates may not scatter light, or may scatter light only slightly, or may scatter light in insignificant amounts. Such a feature may be advantageous in allowing the clear transmission of a variety of wavelengths of light through the substrate 14.

Second, as the precipitates are formed in a post-casting heat-treating process, the refractive index and UV cutoff may be locally changeable. This tunability is unique relative to virtually all known UV absorbing glasses and glass-ceramics, which require alterations to the composition or melting conditions to vary the optical absorbance. For example, as a refractive index delta of $1.5 \times 10^{-2}$ or greater may be achieved, the portion of the substrate 14 containing the precipitates may channel light such that the article 10 and/or substrate 14 may be a Bragg filter, a waveguide, gratings-based technologies (e.g., augmented reality), and component thereof. Further, as the glass-ceramic composition allows for the elimination of traditional waveguides which allows greater dimensional stability, elimination of aberrations caused by the glass-polymer CTE mismatch (e.g., in convention polymer-glass solutions) may be achieved. As the refractive index delta which may be produced is an order of magnitude greater than known inorganic photorefractive methods, more efficient waveguides and optical components may be produced.

Third, as the size and quantity of the precipitates may be controlled through a post-casting heat-treatment, a single molten glass heat may be cast in a variety of glass-ceramic structures, each of which may be heat-treated differently to produce a different optical profile (e.g., different refractive index, UV cutoff, near-infrared transmission and/or pattern thereof). Such a feature may be advantageous in allowing a variety of parts, each with a different optical profile, to be cast from a single composition of the glass-ceramic.

Fourth, as the glass-ceramic composition may have a relatively low coefficient of thermal expansion, the glass-ceramic article 10 and substrates 14 formed from the glass-ceramic material may be used in a variety of temperature sensitive applications. Further, articles 10 formed of the glass-ceramic composition can withstand large and rapid fluctuations in temperature, making them suitable for operating in harsh environments.

Fifth, as the heat-treating temperatures used to produce the precipitates are below the softening point of the glass-ceramic, articles 10 manufactured from the glass-ceramic may be heat-treated to form the precipitates pre- or post-other manufacturing processes to shape the article 10. Further, defects associated with softening of the glass-ceramic material during conventional heat-treating and annealing steps may be avoided while generating the precipitates.

EXAMPLES

The following examples represent certain non-limiting examples of the glass-ceramic materials and articles of the disclosure, including the methods of making them.

Figure 3A:
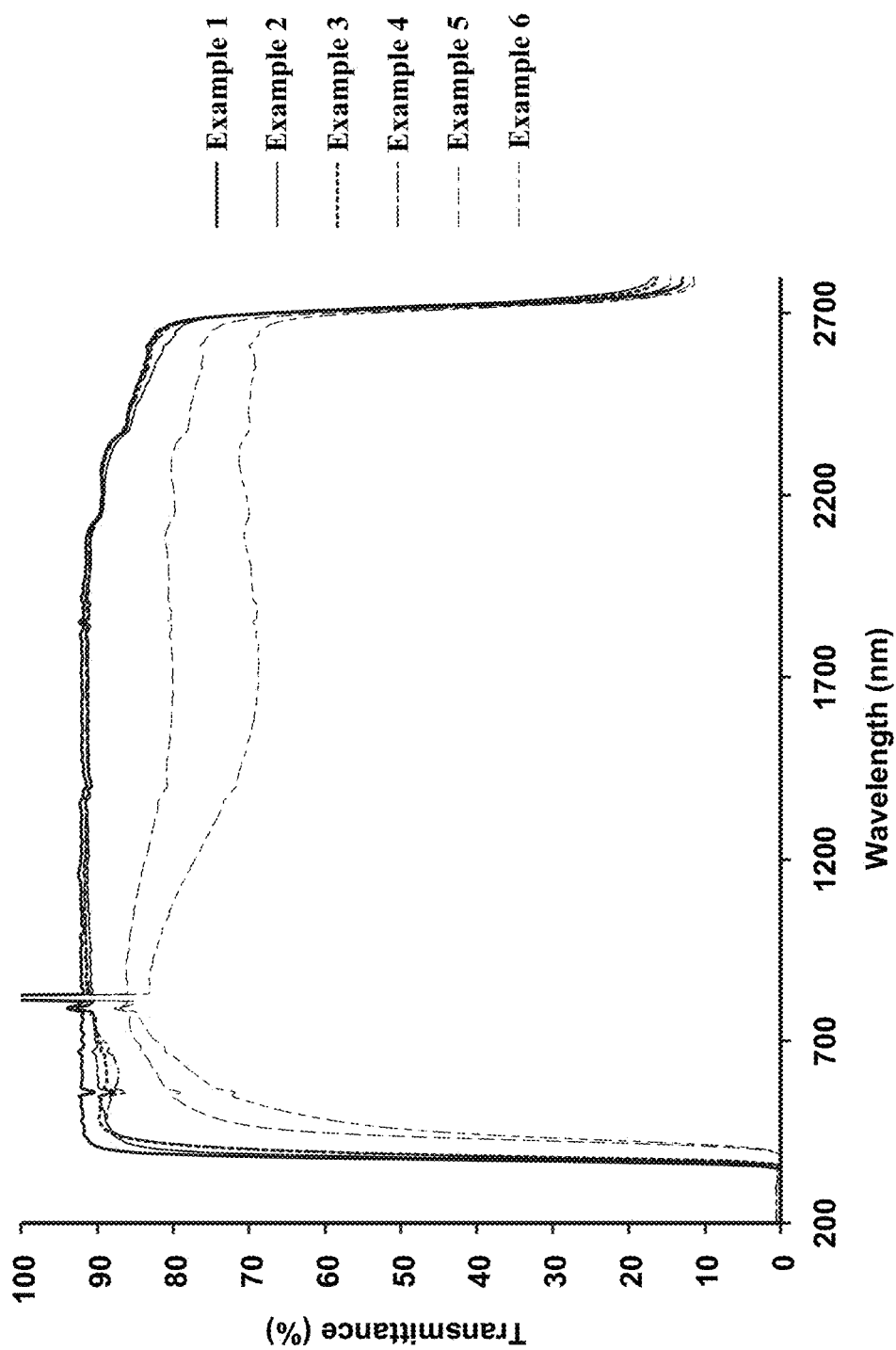
FIG. 3A is a plot of transmittance vs. wavelength of heat-treated glass-ceramics prepared according to at least one example of the disclosure.
Figure 3B:
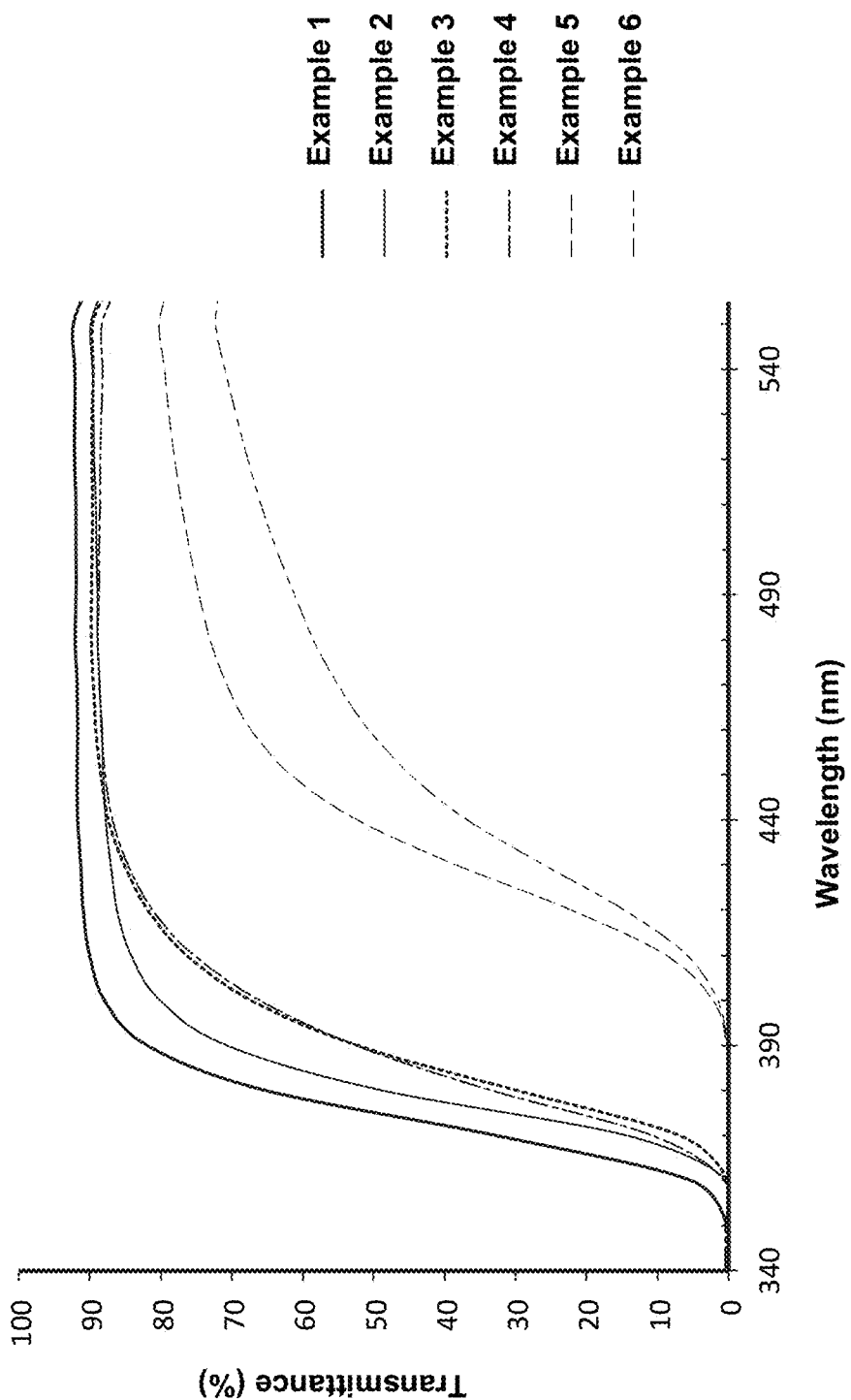
FIG. 3B is the plot in FIG. 3A, as rescaled to show the cutoff wavelength of the heat-treated glass-ceramic samples.

Referring now to FIGS. 3A and 3B, depicted are transmittance spectra of six examples ("Examples 1-6") of glass-ceramics structures (e.g., the article 10 and/or substrate 14) employing a tungsten-containing glass-ceramic composition (e.g., the glass-ceramic composition) having undergone different post casting procedures (e.g., the heat-treating step 62). The samples were 1 mm thick polished flats having a composition (e.g., sample 15 of Table 2.1) provided by Table 4:

TABLE 4

| Oxides | mol % |
| --- | --- |
| $SiO_2$ | 60.1 |
| $Al_2O_3$ | 6.6 |
| $Cs_2O$ | 6.6 |
| WO3 | 6.6 |
| $SnO_2$ | 0.1 |
| $B_2O_3$ | 20 |

The samples were prepared by weighing the batch constituents, mixing them by a shaker mixer or ball mill for 15-60 minutes and melting for 6-12 hours at temperatures between about 1550° C. to about 1650° C. in Pt crucibles. Examples 1-6 were annealed at a temperature of between about 520° C. to about 570° C. Quenched specimens were made by pressing a about 100 g sample of glass-ceramic between two steel plates to approximately 10 mm thickness. To develop their unique optical extinction (e.g., the UV cutoff), the examples were heat treated for various times at various temperatures. Example 1 is a sample of as-cast tungsten containing glass-ceramic. Example 2 is a sample of cast then annealed tungsten containing glass-ceramic. Example 3 is a tungsten-containing glass-ceramic that was annealed and then heat treated at about 550° C. for about 136 minutes. Example 4 is a tungsten-containing glass-ceramic that was annealed and then heat treated at about 600° C. for about 98 minutes. Example 5 is a tungsten-containing glass-ceramic that was annealed and then heat treated at about 650° C. for about 130 minutes. Example 6 is a tungsten-containing glass-ceramic that was annealed and then heat treated at about 700° C. for about 30 minutes. Table 5 provides the percent transmittance data for polished flats of Example 4 at thicknesses of 0.9 mm, 0.8 mm, and 0.7 mm at 351 nm, 374 nm, and 1053 nm. Note the transmittance values reported in Table 5 are reported as total transmittance (i.e., reflectance has not been factored out). In turn, with reflectance accounted for and an anti-reflective coating added, it is believed that the tungsten-containing glass-ceramic can achieve >99% transmission at 1053 nm.

TABLE 5

| λ(nm) | % T 0.9 mm | % T 0.8 mm | % T 0.7 mm |
| --- | --- | --- | --- |
| 1053 | 95.09 | 95.63 | 96.16 |
| 374 | 51.08 | 55.04 | 59.30 |
| 351 | 1.99 | 3.08 | 4.76 |

As can be seen from the transmittance spectra provided in FIGS. 3A and 3B, the different heat treatments result in both different visual region transmittance as well as different optical extinctions. It is believed that by altering the length and/or temperature at which the heat-treatment is performed, glass-ceramics with transmittance spectra that fall within the region between Examples 3 and 5 may be produced, thereby producing materials with UV cutoff wavelengths ranging from about 360 nm to about 380 nm. It will be understood that the sharp increase or 'spike' absorbance at about 800 nm in an artifact of detector change and does not actually represent a change in absorbance.

Figures 4A, 4B, 4C:
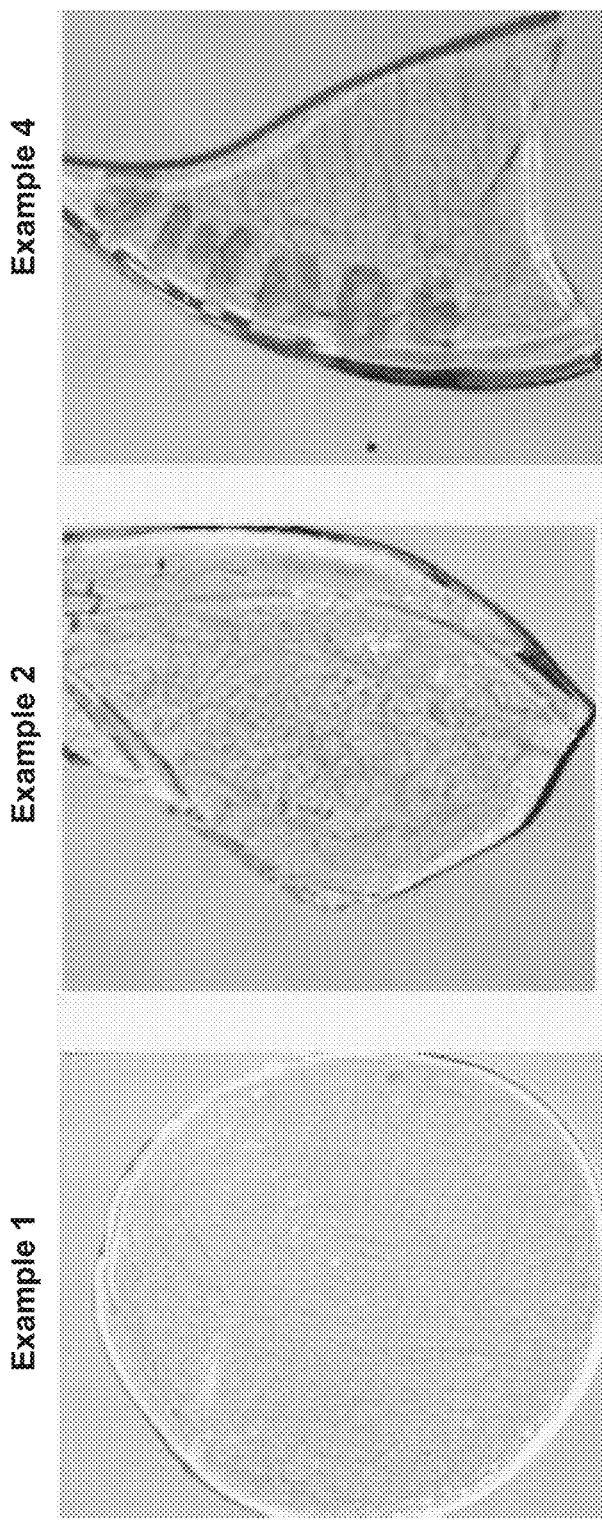
FIG. 4A is an image of an unannealed sample of the glass-ceramic of the present disclosure.
FIG. 4B is an image of a sample of the glass-ceramic of the present disclosure heat-treated at 550° C. for 2 hours and 16 minutes.
FIG. 4C is an image of a sample of the glass-ceramic of the present disclosure heat-treated at 600° C. for 1 hour and 38 minutes.

Referring now to FIGS. 4A-4C, depicted are images of as made Example 1 (FIG. 4A), Example 2 (FIG. 4B) and Example 4 (FIG. 4C) demonstrating the optical clarity and minimal color obtained by the tungsten-containing glass-ceramic after varying post-processing techniques.

Figure 5:
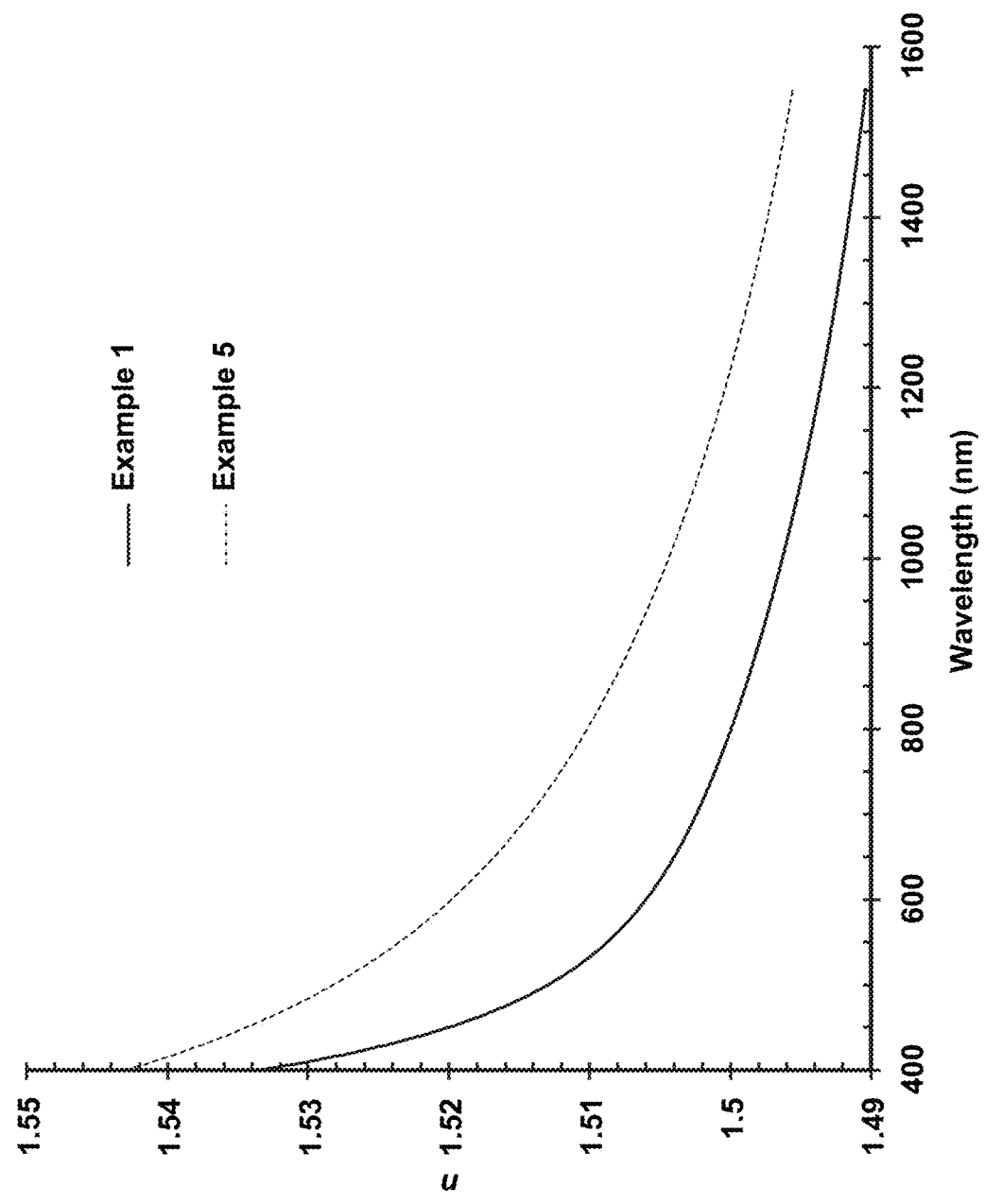
FIG. 5 is a plot of refractive index (n) vs. wavelength (nm) of an unannealed glass-ceramic example and a heat treated glass-ceramic example.

Referring now to FIG. 5, depicted is a plot of refractive index vs. wavelength between Example 1 (e.g., as cast tungsten containing glass-ceramic) and Example 5 (e.g., tungsten-containing glass-ceramic annealed and then heat treated at about 650° C. for about 130 minutes). As can be seen, the crystalline tungsten oxide and/or tungsten-containing precipitates generated in the heat treating process have increased the refractive index of Example 5 relative to Example 1 for all depicted wavelengths demonstrating that the presence of the tungsten-containing precipitates pushes the refractive index of the tungsten-containing glass-ceramic toward the refractive index of $WO_3$ as provided in Table 3.

Figure 6:
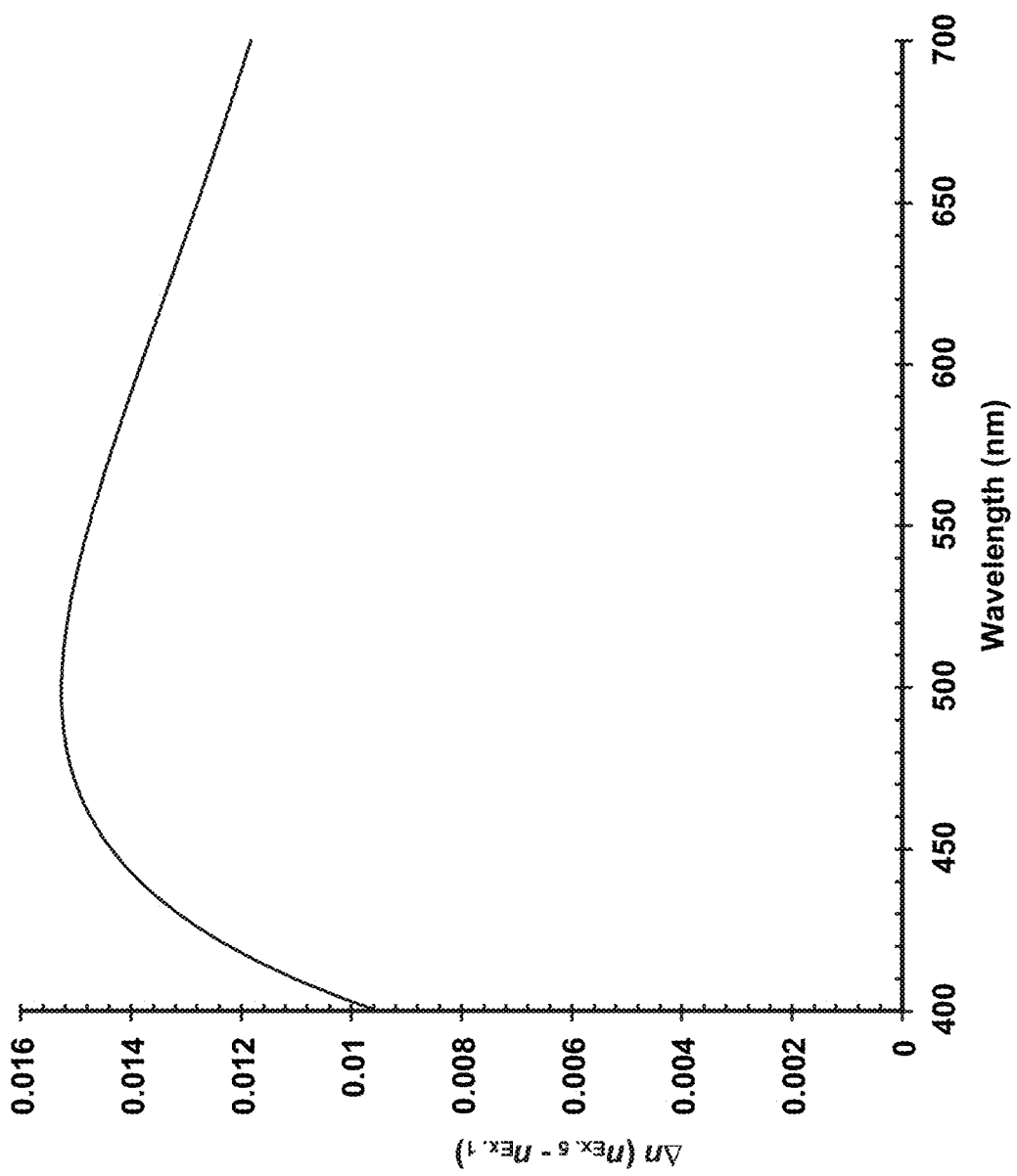
FIG. 6 is a plot of refractive index delta vs wavelength for the samples of FIG. 5.

Referring now to FIG. 6, depicted is a plot of the difference, or change, in refractive index between Example 1 and Example 5. As can be seen from the plot, the difference in refractive index is greater than about $1.5 \times 10^{-3}$ for all wavelengths and peaks at about $1.5 \times 10^{-2}$ at around 475 nm. As explained above, the large difference in refractive index which may be obtained through different heat treatments may allow for higher efficiency waveguides, holographic optical elements, volume gratings, and/or other types of passive optical devices that rely on periodic modulation in refractive index.

Figure 7A:
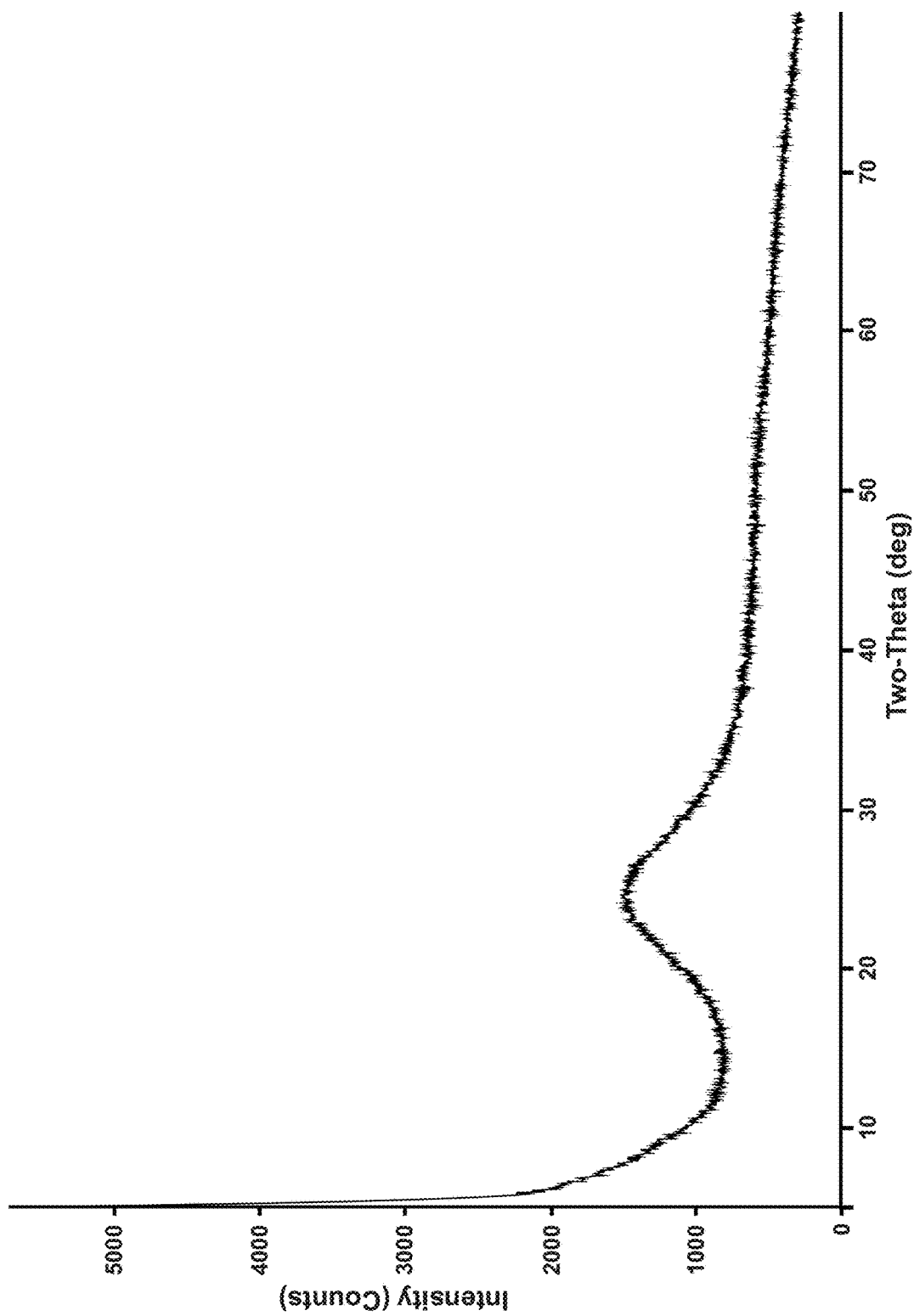
FIG. 7A is a plot of powder X-ray diffraction data of a tungsten oxide glass-ceramic in a green amorphous state, according to at least one example of the disclosure.
Figure 7B:
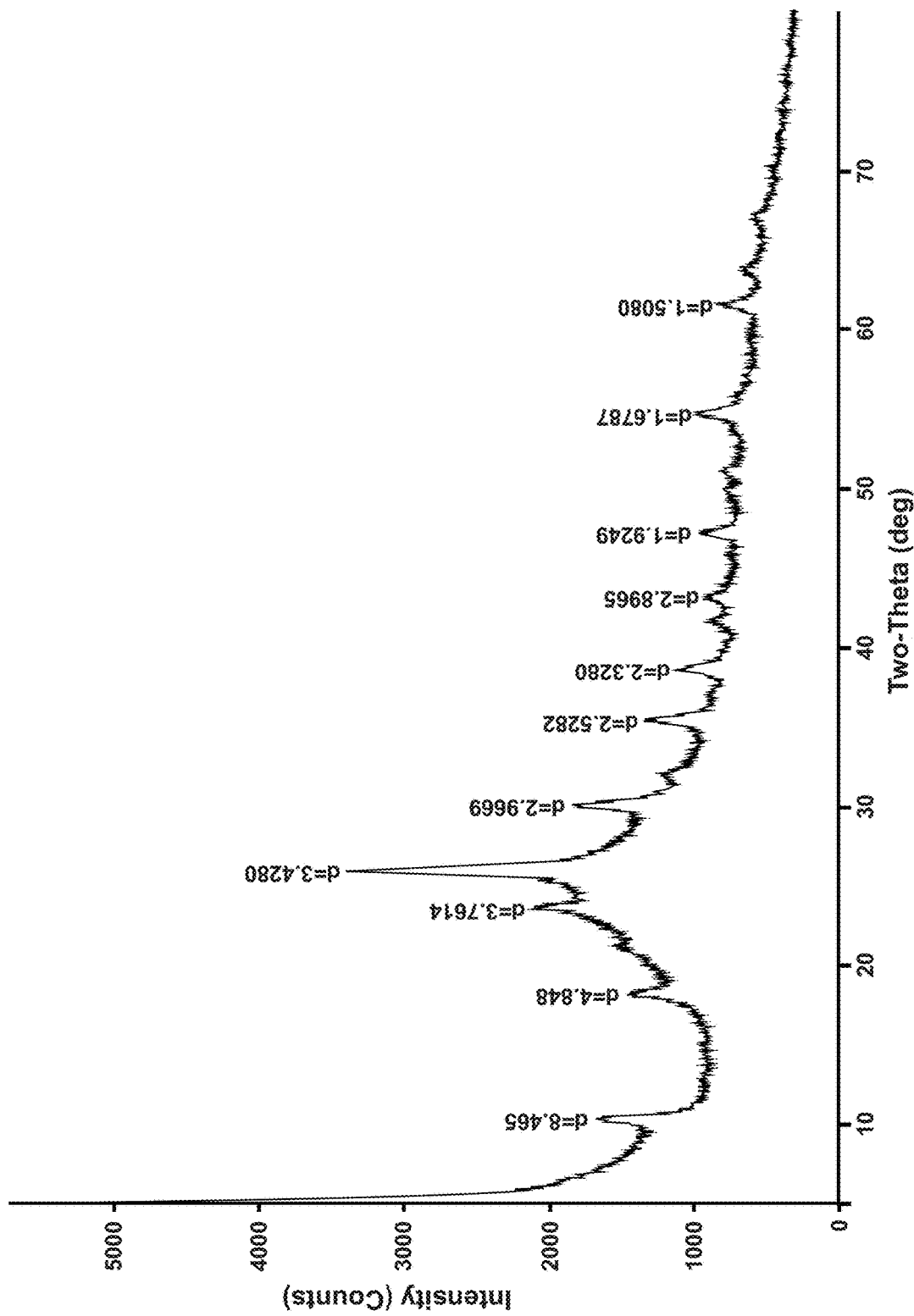
FIG. 7B is a plot of powder X-ray diffraction data of a tungsten oxide glass-ceramic in a heat treated (700° C. for 30 minutes) state, according to at least one example of the disclosure.
Figure 7C:
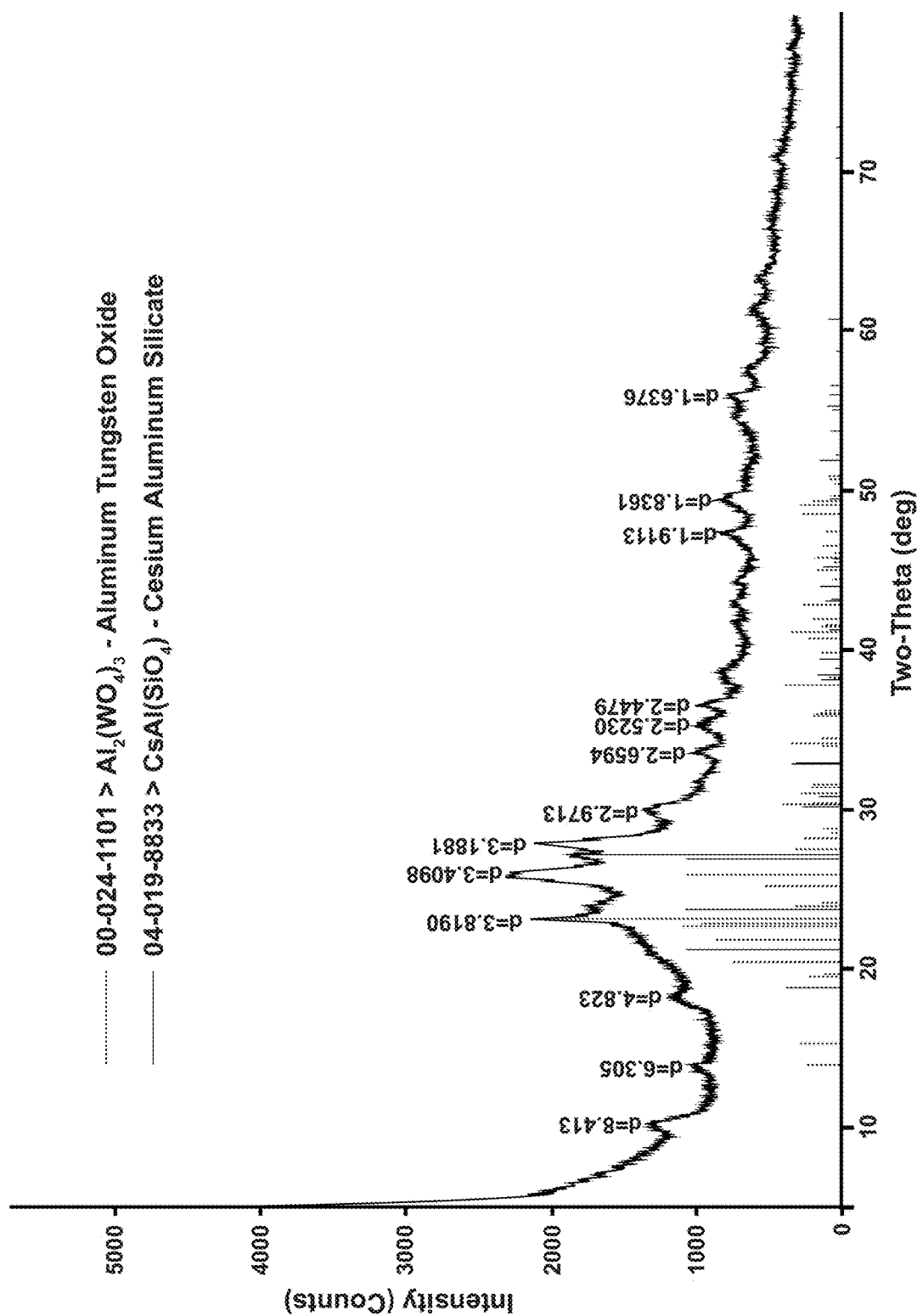
FIG. 7C is a plot of powder X-ray diffraction data of a tungsten oxide glass-ceramic in an annealed state, according to at least one example of the disclosure.
Figures 8A, 8B:
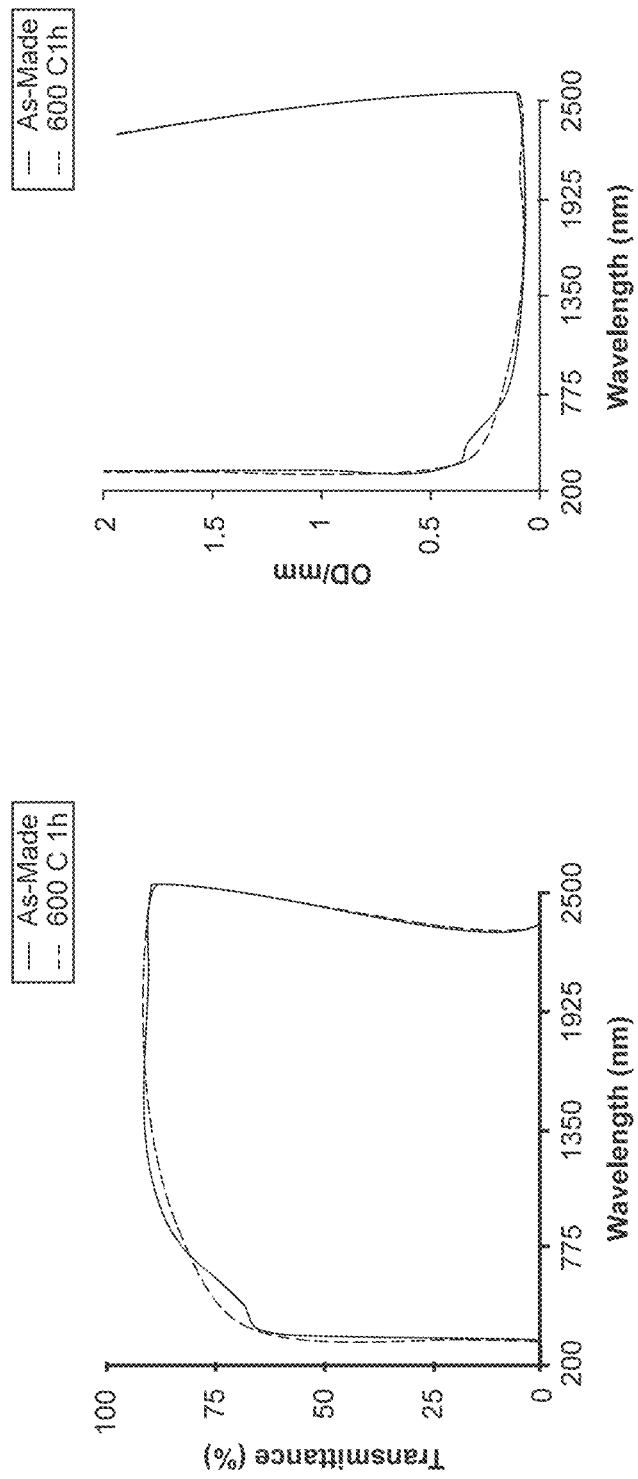
FIGS. 8A and 8B are transmittance spectra and absorbance spectra in OD/mm collected of 0.5 mm polished flats of composition 889FLZ in the as-made un-annealed state and heat treated condition (600° C. 1 h); 11/18
Figures 9A, 9B:
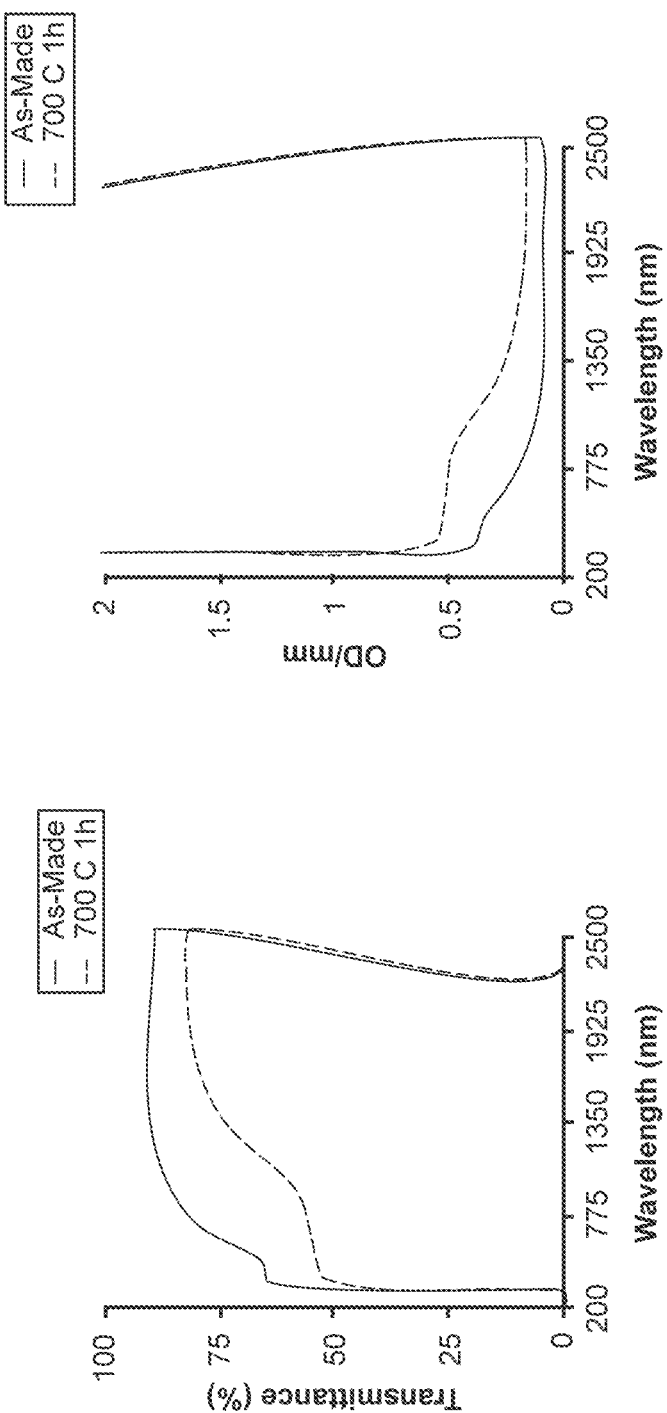
FIGS. 9A and 9B are transmittance spectra and absorbance spectra in OD/mm collected of 0.5 mm polished flats of composition 889FMB in the as-made un-annealed state and heat treated condition (700° C. 1 h)
Figures 10A, 10B:
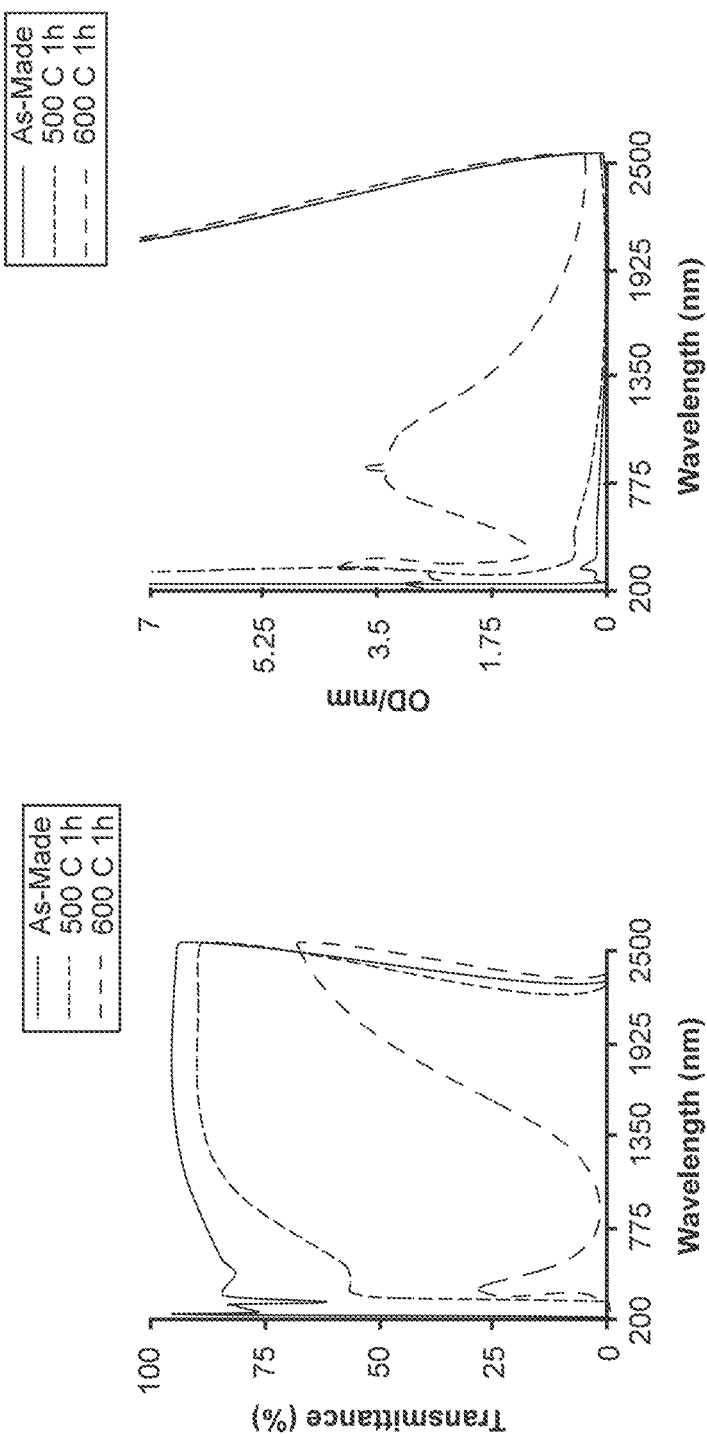
FIGS. 10A and 10B are transmittance spectra and absorbance spectra in OD/mm collected of 0.5 mm polished flats of composition 889FMC in the as-made un-annealed state and heat treated condition (500° C. 1 h and 600° C. 1 h)
Figure 11B:
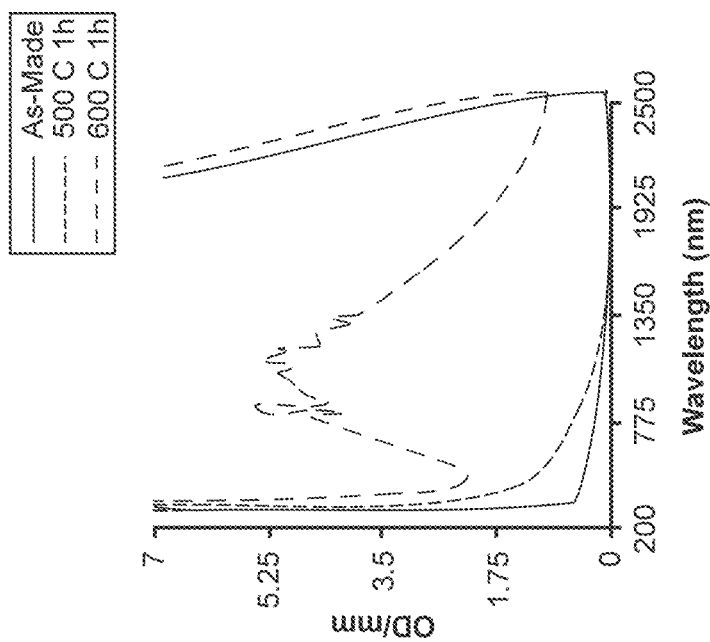
FIGS. 11A and 11B are transmittance spectra and absorbance spectra in OD/mm collected of 0.5 mm polished flats of composition 889FMD in the as-made un-annealed state and heat treated condition (500° C. 1 h and 600° C. 1 h)
Figure 11A:
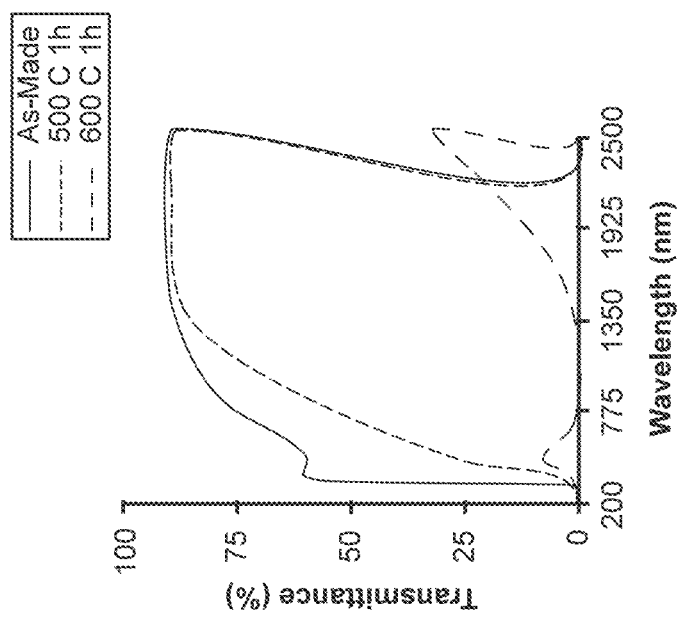
Figure 12B:
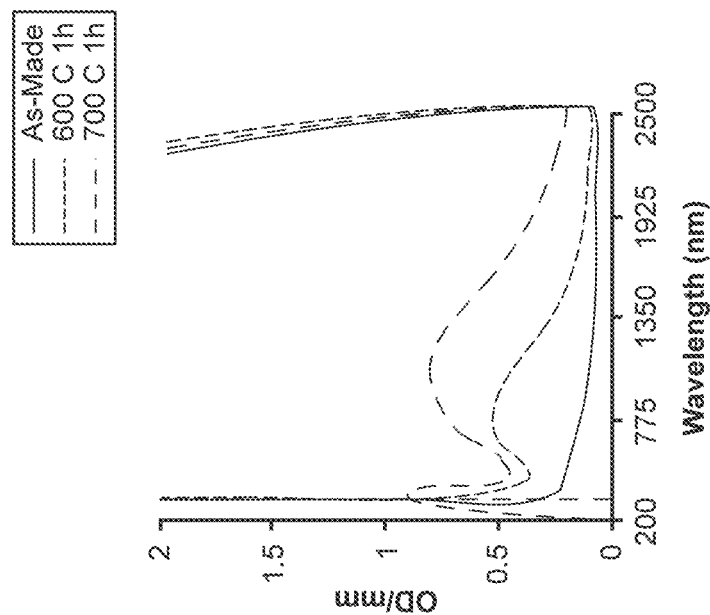
FIGS. 12A and 12B are transmittance spectra and absorbance spectra in OD/mm collected of 0.5 mm polished flats of composition 889FME in the as-made un-annealed state and heat treated condition (600° C. 1 h and 700° C. 1 h)
Figure 12A:
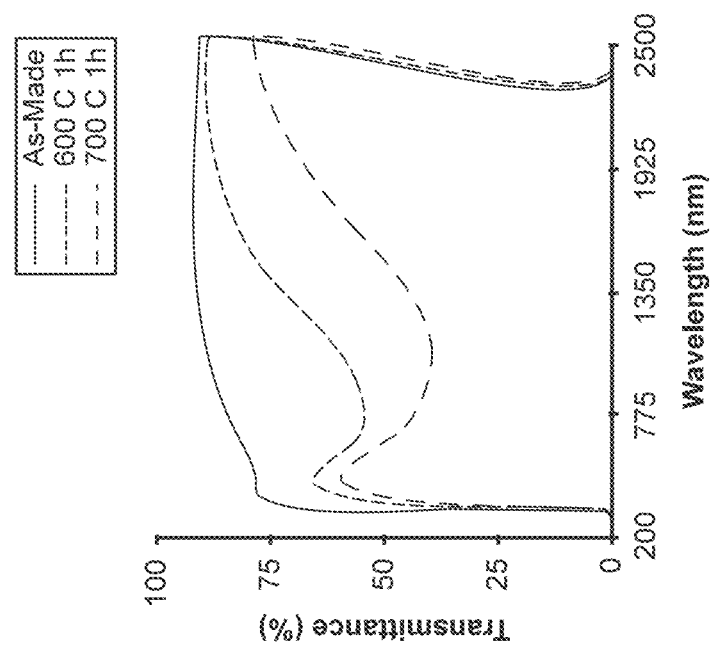
Figure 13B:
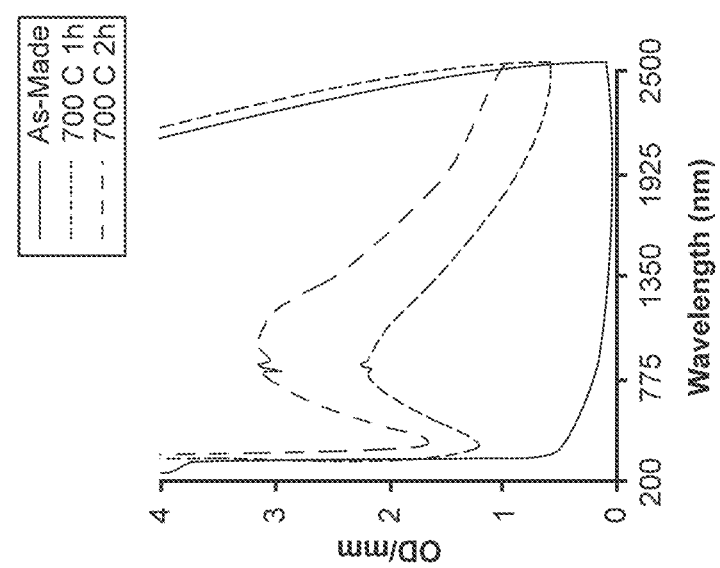
FIGS. 13A and 13B are transmittance spectra and absorbance spectra in OD/mm collected of 0.5 mm polished flats of composition 889FMG in the as-made un-annealed state and heat treated condition (700° C. 1 h and 700° C. 2 h)
Figure 13A:
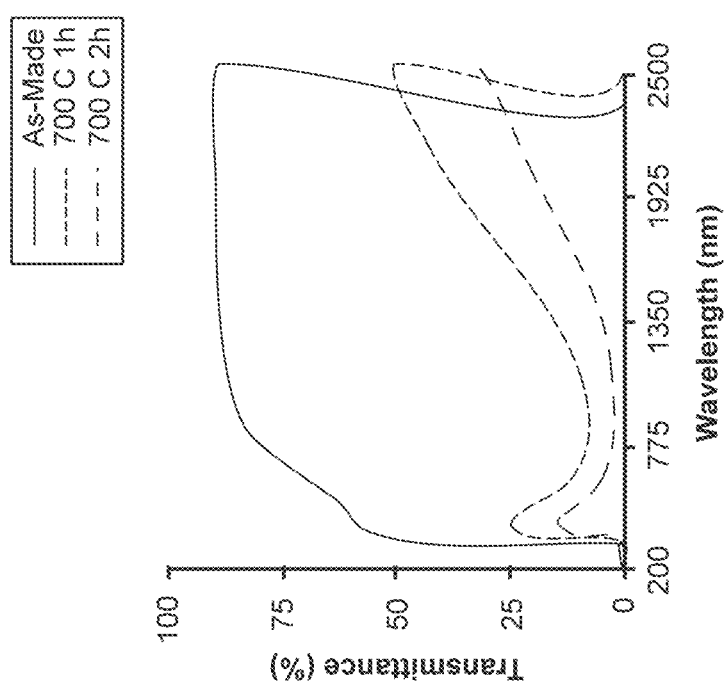
Figure 14A:
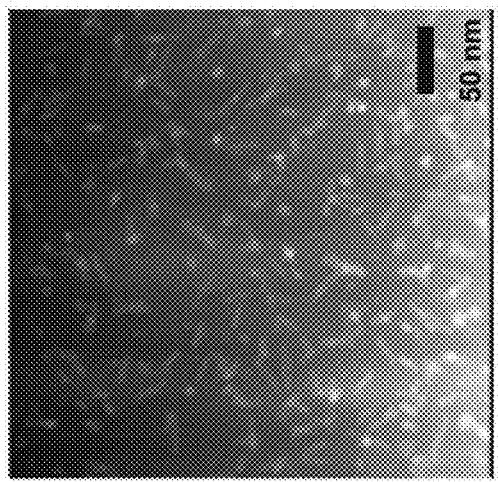
FIGS. 14A-14D are TEM micrographs at four different magnifications of titanium-containing crystals within a heat treated sample of composition 889FMC that was heat treated at 700° C. for one hour.
Figure 14B:
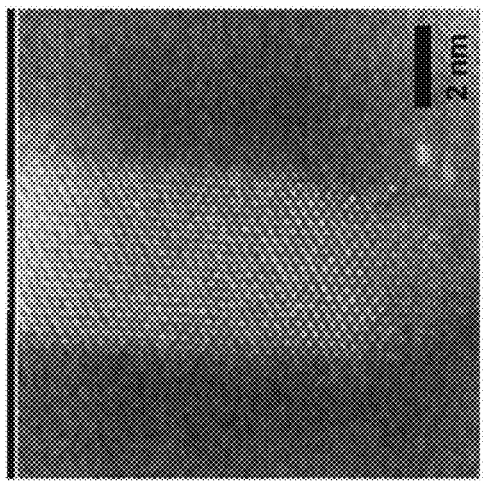
Figure 14C:
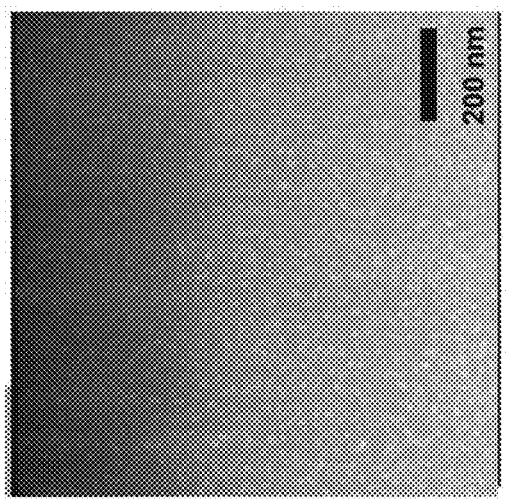
Figure 14D:
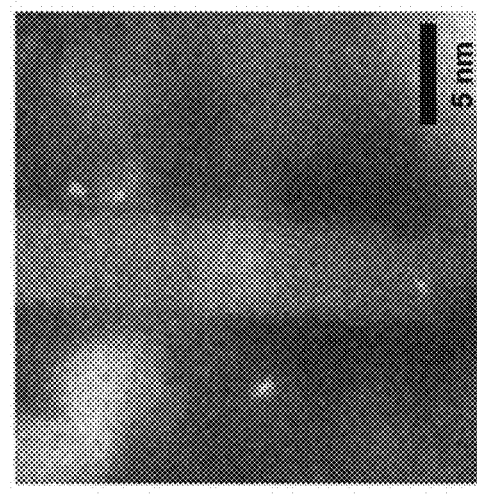

Referring now to FIGS. 7A-7C, depicted are powder x-ray diffraction (XRD) plots for the different examples provided above. FIG. 7A depicts the powder XRD of Example 1 in the "green" x-ray amorphous state prior to heat treatment. As can be seen from the plot, Example 1 contains no crystalline phases present within the tungsten-containing glass-ceramic that XRD can detect. This shows that the as-cast tungsten containing glass-ceramic does not generate the precipitates until a heat treatment is performed. FIG. 7B depicts powder XRD of Example 2. As can be seen from the plot, annealing of the tungsten-containing glass-ceramic begins to form crystalline precipitates. FIG. 7C depicts powder XRD of Example 6. As can be seen from the plot, the heat-treatment has produced crystalline tungsten oxide precipitates within the glass-ceramic, thereby confirming the structure of the glass-ceramic. The plots of FIGS. 7A-7C demonstrate that it is the heat treating of the glass-ceramic which produces the tungsten-containing crystalline precipitates which are the species that alters the optical properties of the glass-ceramic.

Titanium Comprising Examples

Referring now to Tables 6A and 6B, provided are a list of exemplary glass ceramic compositions for articles including titanium.

TABLE 6A

| Oxide (mol %) | 889FLY | 889FLZ | 889FMA | 889FMB | 889FMC | 889FMD | 889FME | 889FMF | 889FMG |
|---|---|---|---|---|---|---|---|---|---|
| $SiO_2$ | 57.86 | 60.88 | 63.89 | 70.92 | 67.93 | 64.92 | 63.92 | 62.21 | 65.79 |
| $Al_2O_3$ | 12.05 | 9.03 | 9.03 | 9.03 | 9.03 | 9.03 | 12.04 | 13.40 | 13.78 |
| $B_2O_3$ | 20.08 | 20.07 | 20.07 | 10.04 | 10.03 | 10.03 | 7.02 | 4.92 | 4.91 |
| $Li_2O$ | 6.02 | 6.02 | 3.01 | 6.02 | 6.02 | 6.02 | 6.02 | 0.00 | 7.75 |
| $Na_2O$ | 0.00 | 0.00 | 0.00 | 0.00 | 3.00 | 6.00 | 7.00 | 13.19 | 1.94 |
| $K_2O$ | 0.00 | 0.00 | 0.00 | 0.00 | 0.00 | 0.00 | 0.00 | 0.00 | 0.03 |
| MgO | 0.00 | 0.00 | 0.00 | 0.00 | 0.00 | 0.00 | 0.00 | 2.29 | 0.00 |
| CaO | 0.00 | 0.00 | 0.00 | 0.00 | 0.00 | 0.00 | 0.00 | 0.13 | 0.01 |
| $SnO_2$ | 0.05 | 0.05 | 0.05 | 0.05 | 0.05 | 0.05 | 0.05 | 0.08 | 0.05 |
| ZnS | 1.68 | 1.68 | 1.68 | 1.68 | 1.68 | 1.68 | 1.68 | 1.61 | 1.64 |
| $P_2O_5$ | 0.00 | 0.00 | 0.00 | 0.00 | 0.00 | 0.00 | 0.00 | 0.00 | 1.90 |
| $Fe_2O_3$ | 0.01 | 0.01 | 0.01 | 0.01 | 0.01 | 0.01 | 0.01 | 0.01 | 0.00 |
| Cl— | 0.00 | 0.00 | 0.00 | 0.00 | 0.00 | 0.00 | 0.00 | 0.00 | 0.00 |
| $TiO_2$ | 2.26 | 2.26 | 2.26 | 2.26 | 2.26 | 2.26 | 2.26 | 2.17 | 2.21 |
| $As_2O_5$ | 0.00 | 0.00 | 0.00 | 0.00 | 0.00 | 0.00 | 0.00 | 0.00 | 0.00 |
| $V_2O_5$ | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 |
| $R_2O$—$AL_2O_3$ | −6.02 | −3.01 | −6.02 | −3.01 | −0.01 | 2.99 | 0.98 | −0.21 | −4.06 |

TABLE 6B

| Oxide (mol %) | 889FRY | 889FRZ | 889FSA | 889FSB | 889FSC | 889FSD | 889FSE |
|---|---|---|---|---|---|---|---|
| $SiO_2$ | 63.02 | 63.26 | 63.46 | 63.71 | 62.93 | 62.94 | 62.90 |
| $Al_2O_3$ | 3.21 | 3.23 | 3.24 | 3.25 | 3.21 | 3.21 | 3.21 |
| $B_2O_3$ | 19.33 | 19.40 | 19.46 | 19.54 | 19.29 | 19.28 | 19.29 |
| $Li_2O$ | 7.42 | 7.45 | 7.47 | 7.50 | 7.41 | 7.40 | 7.40 |
| $Na_2O$ | 1.85 | 1.86 | 1.87 | 1.87 | 1.85 | 1.85 | 1.85 |
| $K_2O$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| CaO | 0.01 | 0.01 | 0.01 | 0.01 | 0.01 | 0.01 | 0.01 |
| $SnO_2$ | 0.05 | 0.05 | 0.05 | 0.05 | 0.05 | 0.05 | 0.05 |
| ZnS | 1.18 | 0.79 | 1.18 | 0.79 | 1.57 | 1.56 | 1.57 |
| $P_2O_5$ | 1.82 | 1.83 | 1.83 | 1.84 | 1.82 | 1.82 | 1.82 |
| $Fe_2O_3$ | 0.00 | 0.00 | 0.00 | 0.00 | 0.00 | 0.00 | 0.00 |
| Cl | 0.00 | 0.00 | 0.00 | 0.00 | 0.00 | 0.00 | 0.00 |
| $TiO_2$ | 2.11 | 2.12 | 1.42 | 1.43 | 1.88 | 1.88 | 1.88 |
| $As_2O_3$ | 0.00 | 0.00 | 0.00 | 0.00 | 0.00 | 0.00 | 0.00 |
| $V_2O_5$ | 0.00 | 0.00 | 0.00 | 0.00 | 0.00 | 0.00 | 0.03 |
| Total | 100.00 | 100.00 | 100.00 | 100.00 | 100.00 | 100.00 | 100.00 |
| $R_2O$—$AL_2O_3$ | 6.06 | 6.08 | 6.10 | 6.13 | 6.05 | 6.05 | 6.05 |

Referring now to Table 6C and FIGS. 8A-13B, provided is optical data for a sampling of compositions from Tables 6A and 6B.

TABLE 6C

| Glass Code | Heat Treat | Average UV Transmittance (%) (200-400 nm) | Average VIS Transmittance (%) (400-750 nm) | Average NIR Transmittance (%) (750-1500 nm) |
|---|---|---|---|---|
| 889FLZ | As-made | 22.7 | 73.8 | 88.6 |
| 889FLZ | 600° C.-1 hour | 23.7 | 76.2 | 87 |
| 889FMB | As-made | 22.8 | 71.2 | 87.3 |
| 889FMB | 700° C.-1 hour | 17 | 54.9 | 66.3 |
| 889FMC | As-made | 19.3 | 61.2 | 83.2 |
| 889FMC | 500° C.-1 hour | 66.7 | 84 | 91.8 |
| 889FMC | 600° C.-1 hour | 7.3 | 11.3 | 6.7 |
| 889FMD | As-made | 20.8 | 64.2 | 83.9 |
| 889FMD | 500° C.-1 hour | 2.1 | 33 | 73.5 |
| 889FMD | 600° C.-1 hour | 0.4 | 4.1 | 0.8 |
| 889FME | As-made | 26.1 | 80.5 | 88.9 |
| 889FME | 600° C.-1 hour | 14 | 59.9 | 64 |
| 889FME | 700° C.-1 hour | 12.2 | 53.1 | 42.7 |
| 889FMG | As-made | 20 | 67.5 | 85.9 |
| 889FMG | 700° C.-1 hour | 6.7 | 15.4 | 12 |
| 889FMG | 700° C.-2 hours | 2.2 | 7.7 | 4 |

The various compositions of Table 6C and FIGS. 8A-13B were prepared by weighing the batch constituents, mixing the batch constituents by shaker-mixer or ball mill and melting for 4-32 hours at temperatures between 1300°-1650° C. in fused silica crucibles. Glasses were cast onto a metal table to produce a 0.5 mm thick patty of glass. Some melts were cast onto a steel table and then rolled into sheet using a steel roller. To develop and control optical transmission and absorbance, the samples were heat treated for times ranging from 5-500 minutes at temperatures ranging from 425-850° C. in ambient air electric ovens. The sample patties were then polished to a thickness of 0.5 mm and tested.

As evident from the data of Table 6C and FIGS. 8A-13B, the as-made state of the titanium containing glass are highly transparent in the NIR regime, and largely transparent at visible wavelengths. Upon thermal treatment at temperatures ranging from about 500° C. to about 700° C., the crystalline phase (i.e., titanium suboxides) is precipitated and the optical transmittance of these samples decreases and some become strongly absorbing in the NIR.

Powder X-ray diffraction was performed on each of the compositions of Table 6C and indicated that all compositions were X-ray amorphous in the as-made and un-annealed state. Heat treated samples showed evidence of some titania-bearing crystalline phases including Anatase (889FLY) and Rutile (889FMC and 889FMD). The samples exhibited low haze (i.e., about 10% or less, or about <5% or less, or about 1% or less, or about 0.1% or less). Without being bound by theory, the low haze that these compositions exhibited in the as-made and post-heat treated state is due to the fact that the crystallites are quite small (i.e., about 100 nm or less) and in low abundance (i.e., due to the fact that $TiO_2$ was introduced at only about 2 mol %). Accordingly, it is believed that the species forming in these materials are below the detection limits (in size and abundance) for conventional powder XRD. This hypothesis was confirmed by TEM microscopy.

Referring now to FIGS. 14A-D, provided are TEM micrographs at four different magnifications of titania-containing crystals within a sample of glass code composition 889FMC that was heat treated at 700° C. for one hour. These crystals are rod-like in appearance and have an average width of about 5 nm and an average length of about 25 nm.

Figure 15B:
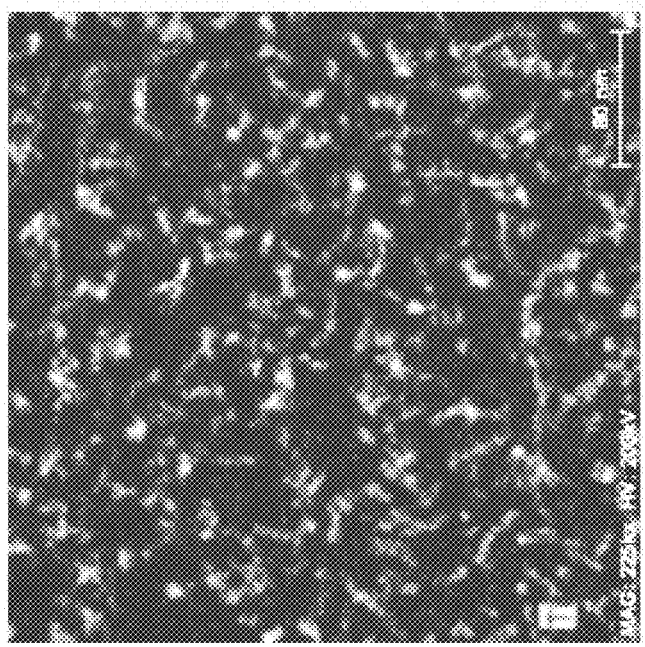
FIG. 15B is an electron dispersive spectroscopy (EDS) elemental map of titanium of the TEM micrograph of FIG. 19A.
Figure 15A:
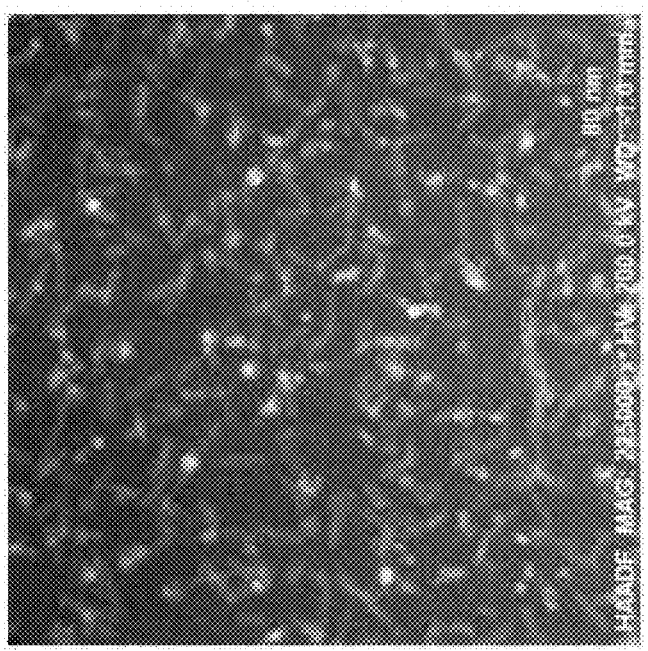
FIG. 15A is a TEM micrograph of titanium-containing crystals within a heat treated sample of composition 889FMC that was heat treated at 700° C. for one hour.

Referring now FIGS. 15A and 15B, provided is a TEM micrograph (FIG. 15A) and corresponding EDS elemental map (FIG. 15B) of a heat treated sample of glass code composition 889FMC. As can be seen from FIG. 15A, the sample includes a plurality of crystallites. The EDS map was set to detect titanium. As can be seen, the results of the EDS mapping of titanium closely track with the crystallites indicating that the crystallites are rich in titanium. In this map, the light or 'white' regions indicate the presence of Ti.

Referring now to Table 7A, provided is an exemplary glass composition which is free of titanium.

TABLE 7A

| Oxides (mol %) | 196 KGA |
|---|---|
| $SiO_2$ | 66.5646 |
| $Al_2O_3$ | 9.5109 |
| $B_2O_3$ | 9.3209 |
| $Li_2O$ | 3.8038 |
| $Na_2O$ | 4.3623 |
| $K_2O$ | 1.5693 |
| MgO | 0.0148 |
| $SnO_2$ | 0.0951 |
| $WO_3$ | 3.8045 |
| $MoO_3$ | 0.9511 |
| $Fe_2O_3$ | 0.0027 |
| Total | 100.0000 |

Table 7B provides solar performance metrics for a variety of glasses. In Table 7B, composition 196KGA is incorporated as a clad layer of a double fusion laminate (i.e., total clad glass-ceramic thickness=0.2 mm), where the core composition of the laminate was chemically strengthened Gorilla® glass from Corning Incorporated®. Composition 196KGA was 1 mm thick and thermally treated at 550° C. for 30 minutes and allowed to cool at 1° C. per minute to 475° C. The 889FMD sample was 5 mm thick and was thermally processed at 600° C. for 1 hour. The 889FMG sample was 0.5 mm thick and was thermally processed at 700° C. for 2 hours. The VG10 samples refer a glass sold under the trade name SGG VENUS (VG 10) by Saint-Gobain® and differ from one another in thickness.

TABLE 7B

| Solar Performance Metric | 196KGA (0.2 mm) | 889FMD (0.5 mm) | 889FMG (0.5 mm) | VG10 (3.85 mm) | VG10 (2.1 mm) | VG10 (0.7 mm) |
|---|---|---|---|---|---|---|
| T_L (A/2°) | 2.6% | 4.7% | 6.8% | 10.6% | 28.1% | 61.7% |
| T_L (ISO 9050) | 3.2% | 5.3% | 7.5% | 10.7% | 28.3% | 61.9% |
| T_TS (ISO 13837A) | 28.0% | 28.9% | 31.4% | 32.8% | 44.0% | 68.1% |
| T_DS (ISO 13837A) | 2.0% | 3.3% | 6.7% | 8.8% | 24.4% | 58.2% |
| R_DS (ISO 13837A) | 4.0% | 4.0% | 4.0% | 4.3% | 4.6% | 5.9% |
| T_E (ISO 9050) | 2.1% | 3.3% | 6.8% | 8.7% | 24.4% | 58.1% |
| T_UV (ISO 9050) | 0.0% | 0.3% | 3.0% | 1.1% | 6.7% | 35.9% |

TABLE 7B-continued

| Solar Performance Metric | 196KGA (0.2 mm) | 889FMD (0.5 mm) | 889FMG (0.5 mm) | VG10 (3.85 mm) | VG10 (2.1 mm) | VG10 (0.7 mm) |
|---|---|---|---|---|---|---|
| T_UV (ISO 13837A) | 0.2% | 1.0% | 6.1% | 3.0% | 11.8% | 42.8% |
| T_IR (VW TL 957) | 1.4% | 2.6% | 5.9% | 7.0% | 21.0% | 55.3% |

In Table 7B, T_L is the total visible light transmittance (which is the weighted-average transmission of light through a glazing at a wavelength range of 380 nm to 780 nm and is tested in accordance with ISO 9050 Section 3.3). T_TS is the total transmitted solar (also referred to as Solar Factor ("SF") or Total Solar Heat Transmission ("TSHT"), which is the sum of the T_DS (total direct solar) plus the fraction of solar energy that is absorbed by the glazing and then re-radiated into a vehicle interior as measured by ISO 13837-2008 Annex B & ISO 9050-2003 section 3.5). In this instance, the T_TS is calculated for a parked car condition with wind speed of 4 m/s (14 km/hr) % with T_TS being equal to (% T_DS)+0.276*(% solar absorption). T_DS is the total direct solar transmittance (also referred to as "Solar Transmission" ("Ts") or "Energy Transmission", which is the weighted-average transmission of light through a glazing at a wavelength range of 300 nm to 2500 nm as measured by ISO 13837 section 6.3.2)). R_DS is the reflected solar component (i.e., with nominally 4% Fresnel reflection). T_E is the solar direct transmittance. T_UV is the UV transmittance as measured under ISO 9050 and ISO 13837 A. T_IR is the infrared transmittance as measured under Volkswagen standard TL957.

As self-evident from the data of Table 7B, glass code 196KGA has the best optical performance and is able to produce the lowest UV, VIS, and NIR transmittance at very short path lengths (0.2 mm). The titanium containing compositions 889FMD and 889FMG at 0.5 mm thickness produce superior optical performance to the VG10 glass at path lengths at or below 3.85 mm. In other words, the titanium containing compositions 889FMD and 889FMG had superior performance to the VG10 glass despite having shorter path lengths.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A glass-ceramic, comprising:
   $SiO_2$ from about 50 mol % to about 80 mol %;
   $Al_2O_3$ from about 0.3 mol % to about 15 mol %;
   $B_2O_3$ from about 5 mol % to about 40 mol %;
   $WO_3$ from about 2 mol % to about 15 mol %;
   $R_2O$ from about 0 mol % to about 15 mol %, wherein $R_2O$ is one or more of $Li_2O$, $Na_2O$, $K_2O$, $Rb_2O$ and $Cs_2O$, wherein a difference in the amount of the $R_2O$ and the $Al_2O_3$ ranges from about −12 mol % to about 2.5 mol %;
   a first portion having an ultraviolet light cutoff at a first cutoff wavelength and a first refractive index at a reference wavelength; and
   a heat treated portion comprising a plurality of crystalline tungsten precipitates, wherein the heat treated portion of the glass-ceramic article exhibits at least one of an ultraviolet light cutoff at a second cutoff wavelength and a second refractive index at the reference wavelength.

2. The glass-ceramic of claim 1, wherein the difference in the amount of $R_2O$ and the $Al_2O_3$ ranges from about −6 mol % to about 0.25 mol %.

3. The glass-ceramic of claim 1, wherein the difference in the amount of $R_2O$ and the $Al_2O_3$ ranges from about −3 mol % to about 0 mol %.

4. The glass-ceramic according to claim 1, further comprising:
   at least one dopant selected from the group consisting of Ti, V, Cr, Mn, Fe, Ni, Cu, Pb, Pd, Au, Cd, Se, Ta, Bi, Ce, Pr, Nd, and Er.

5. The glass-ceramic according to claim 1, wherein the amount of $SiO_2$ is from about 60 mol % to about 70 mol %.

6. A glass-ceramic, comprising:
   $SiO_2$ from about 55 mol % to about 75 mol %;
   $Al_2O_3$ from about 5 mol % to about 12 mol %;
   $B_2O_3$ from about 10 mol % to about 25 mol %;
   $WO_3$ from about 4 mol % to about 10 mol %;
   $R_2O$ from about 3 mol % to about 12 mol %, wherein $R_2O$ is one or more of $Li_2O$, $Na_2O$, $K_2O$, $Rb_2O$ and $Cs_2O$,
   wherein the glass-ceramic comprises an optical transmittance of at least 60% from about 700 nm to about 2700 nm and a sharp cutoff wavelength from about 320 nm to about 420 nm;
   a first portion having an ultraviolet light cutoff at a first cutoff wavelength and a first refractive index at a reference wavelength; and
   a heat treated portion comprising a plurality of crystalline tungsten precipitates, wherein the heat treated portion of the glass-ceramic article exhibits at least one of an ultraviolet light cutoff at a second cutoff wavelength and a second refractive index at the reference wavelength.

7. The glass-ceramic of claim 6, wherein the glass-ceramic has a coefficient of thermal expansion of from about $10 \times 10^{-7}$° $C.^{-1}$ to about $60 \times 10^{-7}$° $C.^{-1}$.

8. The glass-ceramic of claim 6, wherein the glass-ceramic exhibits an optical transmittance of about 90% or greater over a wavelength band from about 500 nm to about 2700 nm at thicknesses from about 1 mm and about 3 mm.

9. The glass-ceramic of claim 8, wherein the $WO_3$ is from about 5 mol % to about 7 mol %.

10. The glass-ceramic article of claim 6, wherein the glass-ceramic comprises about 1 mol % or less of Fe.

11. A glass-ceramic article, comprising:
   $SiO_2$ from about 50 mol % to about 80 mol %;
   $Al_2O_3$ from about 1 mol % to about 15 mol %;
   $B_2O_3$ from about 5 mol % to about 40 mol %;
   $WO_3$ from about 2 mol % to about 15 mol %;
   a first portion having an ultraviolet light cutoff at a first cutoff wavelength and a first refractive index at a reference wavelength; and a heat treated portion comprising a plurality of crystalline tungsten precipitates, wherein the heat treated portion of the glass-ceramic article exhibits at least one of an ultraviolet light cutoff at a second cutoff wavelength and a second refractive index at the reference wavelength.

12. The glass-ceramic article of claim 11, further comprising:
at least one dopant selected from the group consisting of Ti, V, Cr, Mn, Fe, Ni, Cu, Pb, Pd, Au, Cd, Se, Ta, Bi, Ce, Pr, Nd, and Er.

13. The glass-ceramic article of claim 11, wherein a refractive index delta between the first and second refractive indices is about $1 \times 10^{-2}$ or greater from wavelength ranging from about 400 nm to about 800 nm.

14. The glass-ceramic article of claim 11, wherein a crystalline phase of the glass-ceramic article lacks tungsten having an oxidation state less than +6.

* * * * *

UNITED STATES PATENT AND TRADEMARK OFFICE
CERTIFICATE OF CORRECTION

PATENT NO. : 10,829,408 B2  
APPLICATION NO. : 16/190297  
DATED : November 10, 2020  
INVENTOR(S) : Matthew John Dejneka et al.

Page 1 of 1

It is certified that error appears in the above-identified patent and that said Letters Patent is hereby corrected as shown below:

On the Title Page

Column 2, item [56], Line 2, delete "Collaques," and insert -- Colloques, --, therefor.

Signed and Sealed this
Twenty-fifth Day of July, 2023

Katherine Kelly Vidal
*Director of the United States Patent and Trademark Office*